(12) United States Patent
Lessmueller et al.

(10) Patent No.: US 9,784,562 B2
(45) Date of Patent: Oct. 10, 2017

(54) MEASUREMENT DEVICE FOR A LASER PROCESSING SYSTEM AND A METHOD FOR PERFORMING POSITION MEASUREMENTS BY MEANS OF A MEASUREMENT BEAM ON A WORKPIECE

(71) Applicant: Lessmueller Lasertechnik GmbH, Munich (DE)

(72) Inventors: Eckhard Lessmueller, Munich (DE); Christian Truckenbrodt, Munich (DE); Konstantin Werner, Munich (DE)

(73) Assignee: LESSMUELLER LASERTECHNIK GMBH, Munich (DE)

( * ) Notice: Subject to any disclaimer, the term of this patent is extended or adjusted under 35 U.S.C. 154(b) by 0 days.

(21) Appl. No.: 15/170,832

(22) Filed: Jun. 1, 2016

(65) Prior Publication Data
US 2016/0356595 A1    Dec. 8, 2016

(30) Foreign Application Priority Data
Jun. 2, 2015   (DE) .................... 10 2015 007 142

(51) Int. Cl.
*G01B 11/02* (2006.01)
*G01B 9/02* (2006.01)
*B23K 26/044* (2014.01)

(52) U.S. Cl.
CPC ........ *G01B 9/02091* (2013.01); *B23K 26/044* (2015.10); *G01B 2290/65* (2013.01)

(58) Field of Classification Search
CPC   G01B 11/14; G01B 11/2441; G01B 9/02091; G01B 9/0209; G01B 9/02049; G01B 2290/65; B23K 26/032
(Continued)

(56) References Cited

U.S. PATENT DOCUMENTS

| 4,986,664 A * | 1/1991 | Lovoi | B23K 26/032 |
| | | | 219/121.62 |
| 9,566,664 B2 * | 2/2017 | Roos | B23K 26/032 |

(Continued)

FOREIGN PATENT DOCUMENTS

| DE | 10155203 A1 | 6/2003 |
| DE | 102012016788 A1 | 2/2014 |

(Continued)

*Primary Examiner* — Tarifur Chowdhury
*Assistant Examiner* — Jonathon Cook
(74) *Attorney, Agent, or Firm* — Moore & Van Allen PLLC; Henry B. Ward, III

(57) ABSTRACT

The invention relates to a measurement device for a laser processing system, for carrying out position measurements by means of a measurement beam on a workpiece, which is intended for processing by means of a high energy processing beam, which can be moved relative to the workpiece along a predetermined main processing path. The measurement device can be coupled to a processing device and includes an optical coherence tomograph. The measurement device is equipped to shift the measurement beam on the workpiece in the direction of the main processing path in at least one first measurement position and one second measurement position in order to scan measurement positions transversely to the direction of the main processing path in the measurement positions.

14 Claims, 12 Drawing Sheets

(58) Field of Classification Search
USPC .................................................. 356/479, 497
See application file for complete search history.

(56) References Cited

U.S. PATENT DOCUMENTS

| | | | | |
|---|---|---|---|---|
| 2010/0155375 | A1* | 6/2010 | Dietz ..................... | B23K 26/03 |
| | | | | 219/121.18 |
| 2012/0234805 | A1* | 9/2012 | Schwarz ................ | B23K 26/03 |
| | | | | 219/121.63 |
| 2012/0285936 | A1 | 11/2012 | Urashima et al. | |
| 2012/0318775 | A1* | 12/2012 | Schwarz ............. | B23K 26/032 |
| | | | | 219/121.63 |
| 2013/0178952 | A1* | 7/2013 | Wersborg ............. | B23K 1/0056 |
| | | | | 700/47 |
| 2015/0048058 | A1* | 2/2015 | Bruck .................... | B23K 26/34 |
| | | | | 219/76.14 |
| 2016/0114431 | A1* | 4/2016 | Cheverton ........... | B23K 26/342 |
| | | | | 219/76.1 |
| 2016/0144452 | A1* | 5/2016 | Liou .................... | B23K 26/032 |
| | | | | 219/121.83 |

FOREIGN PATENT DOCUMENTS

| | | | |
|---|---|---|---|
| DE | 102013008269 | A1 | 11/2014 |
| DE | 102013015656 | A1 | 3/2015 |
| EP | 1977850 | B1 | 10/2008 |
| WO | 2012037694 | A2 | 3/2012 |

\* cited by examiner

MEASUREMENT DEVICE FOR A LASER PROCESSING SYSTEM AND A METHOD FOR PERFORMING POSITION MEASUREMENTS BY MEANS OF A MEASUREMENT BEAM ON A WORKPIECE

FIELD OF THE INVENTION

The present invention relates to a measurement device for a laser processing system for performing position measurements by means of a measurement beam on a workpiece which is provided for processing by means of a high-energy processing beam, which is movable in a processing direction along a predetermined main processing path relative to the workpiece, wherein the measurement device can be coupled to a processing device and includes an optical coherence tomograph having a measurement beam source for generating the measurement beam, and wherein the measurement device is equipped to shift the measurement beam onto the workpiece within a predetermined measurement range.

BACKGROUND OF THE INVENTION

In known devices, a method known as optical coherence tomography (OCT) is increasingly being used for monitoring (laser) processing operations. This method is based on the fundamental principle of interference of light waves and the resulting effects. Optical coherence tomography makes it possible to detect differences in height along a measurement axis in the micrometer range. To do so measurement light is generated and split by means of a beam splitter into a measurement beam and a reference measurement beam. The measurement beam is conveyed further to a measurement arm where it strikes the surface of a measurement sample, for example, a workpiece to be machined. The measurement beam is at least partially reflected on the surface and directed back at the beam splitter. The reference measurement beam is sent further to the reference arm and is reflected at the end of the reference arm. The reflected reference measurement beam is also sent back to the beam splitter. Finally, the overlap in the reflected beams is detected to determine height information about the surface and/or the depth of penetration of a processing beam, taking into account the length of the reference arm.

Simple coupling of an OCT measurement device with a (laser) processing device is possible since the measurement beam of an optical coherence tomograph runs coaxially with a processing beam and may overlap it.

The documents WO 2012/037694 A2 and US 2012/0285936 A1 describe different embodiments of laser processing devices having interferometric measurement systems for monitoring the laser processing operation, for example, by measuring the depth of penetration of the laser beam.

For the most thorough possible monitoring of a processing operation, in addition to detecting the depth of penetration of the processing beam and the instantaneous processing position on the workpiece (in the area of the steam capillary and the weld pool) the ambient region of the processing position is also to be observed. In this regard, the document DE 101 55 203 A1 describes the fixed alignment of one measurement beam or multiple measurement beams with various regions on the workpiece. This fixed alignment of the respective measurement beam is achieved by a fixed orientation of the measurement beam with input into a beam splitter.

To implement scanning of an ambient region of the processing position on a workpiece, known (laser) processing devices and/or measurement devices are provided with various scanning devices which permit deflection of a measurement beam.

The document DE 10 2103 008 269 A1 describes a laser processing device having an optical coherence tomograph, which includes a scanning device having a plurality of galvanically suspended mirrors (galvanic mirrors). The scanning device is arranged in the beam path of the laser processing device in such a way that controlled adjustment of the galvanic mirror produces a defined shift of the measurement beam as well as the processing laser beams on the workpiece. The measurement beam here is always directed at an instantaneous processing position due to the joint displacement. For detection of the ambient area, in another embodiment, the OCT measurement device has a planar wobble mirror, which is mounted so that it can wobble and can therefore shift the measurement beam on the workpiece in a circular path defined by the wobble mirror around the instantaneous processing position of the processing beam.

A simple displacement of a measurement beam onto ambient regions of a processing position by means of a wobble mirror limits the scanning to a circular path on a workpiece. This has the disadvantage that a relatively large radius of the circular path must be provided to detect regions which are disproportionately a great distance in front of or behind a processing position with respect to a main processing path. Therefore, the measurement beam must be shifted on the workpiece by a comparatively great distance on an arc of a circle, for example, to go from an area behind the processing position to an area in front of the processing position. This reduces the efficiency of a scanning operation and also limits the number of measurement points in a certain measurement area, for example, in front of or behind the processing position.

An alternative to deflection of a measurement beam for scanning a workpiece by means of a wobble mirror is described in the document DE 10 2012 016 788 A1. This document discloses a deflection of a measurement beam by rotation of a polygonal mirror. The polygonal mirror can be rotated at a high rotational speed above an axis of rotation and can thereby deflect an incoming measurement beam in the desired manner. To permit a curved scanning path of the measurement beam on the workpiece, a rotating polygonal mirror having a shaped three-dimensional mirror surface is described.

However, the construction and fabrication of three-dimensional free-form surfaces on a polygon/polygonal body are complex and are associated with a high technical and financial outlay. Furthermore, with the arrangement described here the scanning path of the measurement beam on the workpiece is structurally determined by the shape of the free-form surfaces of the polygonal mirror and cannot be varied during the measurement operation.

The document EP 1 977 850 B1 describes a processing device with an OCT scanning device, which includes a deflecting mechanism and is provided for surface scanning of a workpiece. The deflecting mechanism has at least one movably suspended oscillating mirror, which is equipped to guide the measurement beam for scanning the workpiece surface over the workpiece surface. To focus the measurement beam again after being deflected to focus it by means of the oscillating mirror, the arrangement of an F-theta lens array between the oscillating mirror and the workpiece is also disclosed.

The closest prior art to the present invention is known from the document DE 10 2013 015 656 A1. This document describes a laser processing device comprising an optical coherence tomograph. To detect surface information about the workpiece and in particular the depth of penetration of the processing beam, two measurement beams are formed from one OCT measurement light for the purpose of performing a measurement. It is provided here that the first measurement beam is directed as accurately as possible into a steam capillary of the welding point, i.e., onto the prevailing processing position on the workpiece, and remains there. This serves to monitor the instantaneous depth of penetration of the processing beam into the workpiece. Furthermore, it is described that an adjustment can be carried out before starting the processing operation in order to ensure the accuracy of the measurement of the depth of penetration of the processing beam. To do so lenses can be tilted and/or shifted into the beam path of the measurement beams. The adjustment serves to define the position of the first measurement beam as accurately as possible with the respective instantaneous processing position.

In this state of the art, scanning of a first area around the processing position is implemented with the help of the second measurement beam, which is deflected for scanning on the workpiece by means of a rotary wedge plate, an oscillating mirror or a rotating aspherical optical element. These deflecting components are arranged in the beam path of the second measurement beam in the individual embodiments before the beam is input into the processing head of the device.

In displacement of the measurement beam for scanning ambient areas of the processing position, according to the state of the art, areas of the workpiece surface which are of little or no interest are always also scanned because they are not important for the processing operation that is to be monitored. This reduces scanning efficiency and thus also the efficiency of the monitoring process.

BRIEF SUMMARY OF THE INVENTION

The relative movement between the processing beam and the workpiece during the processing operation can be carried out according to the invention by moving the processing beam and/or the workpiece.

Furthermore, performing position measurements in the sense of the invention is to be understood as detection of measured data in an instantaneous measurement position of the measurement beam on the workpiece. In particular measured data that includes height information, i.e., topographic information about the workpiece surface at the respective instantaneous measurement position, is detected. Detection of height information is very important in view of the height differences between workpieces that are to be welded together and in view of the detection of the depth of penetration of the processing beam into the workpiece. In particular in the case of overlap welds, where two overlapping workpieces are welded to one another, the depth of penetration of the processing beam into the component is to be ascertained in order to be able to detect possible defects.

Taking into account additional information with respect to the shifting of the measurement beam, the measured data detected by the position measurement can be linked according to the invention with information regarding a position and/or the coordinates of the instantaneous measurement position of the measurement beam on the workpiece. To do so, for example, information with regard to a position of components of the measurement device, the processing device and/or the position of the workpiece can be made available.

Measurement equipment described initially is known from the state of the art and can be used for monitoring automatic processing operation and/or welding operations by means of a high energy processing beam, in particular a laser processing beam, during the processing of the workpiece. The monitoring may be used for the purpose of quality control in that cavities and defects, for example, are detected early in the process. Furthermore, the measured data detected by the measurement device can be used for adjusting process parameters and therefore for regulating the processing operation.

By coupling a measurement device to a (laser) processing device and/or a processing head, it was possible to carry out measurements along a predetermined main processing path, for example, in the area of a lap joint or a weld groove and/or a joint edge.

One object of the present invention is to make available a measurement device, a device having a measurement device and a method which enables efficient performance of position measurements on a workpiece. In particular, an improved scanning efficiency is to be achieved through the present invention.

This object is achieved by a measurement device having the features of claim 1, a device having the features of claim 14 and a method having the features of claim 15.

Preferred embodiments are known from dependent claims 2 through 13.

During the processing on the workpiece, according to the invention, the measurement beam can be shifted by the measurement device essentially in the direction of the main processing path into a first measurement position and a second measurement position, wherein the first measurement position lies in front of an instantaneous processing position which is provided, as seen in the processing direction, and a second measurement position lies behind the intended instantaneous processing position, as seen in the processing direction, and the measurement device is also equipped to shift the measurement beam in the at least first and second measurement positions across the direction of the main processing path, so that a plurality of measurement points can be scanned by means of the measurement beam across the direction of the main processing path for detection of measured data in the area of at least the first and second measurement positions.

The invention thus permits a controlled alignment of a single measurement beam with the at least two measurement points in a targeted manner during a processing operation. Measured data about a workpiece surface yet to be processed can be detected by scanning the measurement points in the first measurement position and measured data on a workpiece surface that has already been processed, i.e., a solidified weld can be detected. The measurement beam is therefore aimed in a targeted manner at the different measurement positions to ensure an efficient monitoring of the processing operation. Monitoring of the seam guidance and a subsequent quality assurance can be achieved by means of the measurement device in this way.

The shifting of the measurement beam to the respective measurement positions can be implemented essentially independently of the scanning that is to be performed so that no measurement points are being scanned while the measurement beam is being shifted between the measurement positions. It is thus provided that the measurement beam is aligned with various measurement positions without the measurement beam having to follow fixed scanning path and/or having to perform unnecessary scanning between the measurement positions. In comparison with the state of the art, this increases the efficiency and rate of process monitoring. Furthermore, their distance between the measurement positions and/or between the measurement positions and the instantaneous processing position can be varied so that the flexibility of the monitoring is increased.

The main processing path may be scanned in the same way or differently on the two sides according to the invention. In this way at least three times the width of the main processing path can be scanned. The number of measurement points to be detected in the various measurement positions as well as the respective measurement distance across the direction of the main processing path in the measurement positions can also be adjusted. The resolution of the measurement and the size of the measurement area across the direction of the main processing path can be selected on the basis of the number of measurement points in accordance with the form of the workpieces to be processed and/or the processing operation itself.

Furthermore, the sequence of shifting the measurement beam to the different measurement positions can be varied as desired. Furthermore, the shifting of the measurement beam between the measurement positions by means of the measurement device can be carried out relatively rapidly, so that during the processing of the workpiece, essentially simultaneous detection of measured data of a relevant ambient region of the instantaneous processing position and/or relevant measurement positions is thus made possible.

The detected measured data can be processed further and/or analyzed for a quality evaluation. The processing operation can be regulated on the basis of the measured data detected in the first measurement position; this is done by adjusting the instantaneous processing position, the rate of advance of the processing beam, the relative movement between the processing beam and the workpiece and/or the intensity of the processing beam as a function of the measured data detected. In addition, when a gap is found, the gap can be bridged by oscillation of the processing beam. Furthermore, the quality of the processing operation, more specifically the weld, can be evaluated on the basis of the measured data detected in the second measurement position. This measured data detected in the second measurement position can also be processed further to regulate the processing operation.

In another embodiment of the invention, the measurement beam for scanning the plurality of measurement points in the first measurement position and in the second measurement position can be displaceable across the direction of the main processing path. This line may extend essentially orthogonally to the main processing path.

According to a refinement of the invention the measurement device may be equipped to displace the measurement beam during the processing essentially in the direction of the main processing path into at least one third measurement position which lies in the area of the intended instantaneous processing position provided. In this third measurement position, the measurement beam is thus directed at the vapor capillary in at least some portions, i.e., directed at the so-called keyhole, which is created by the processing beam, in particular to detect measured data with respect to the depth of penetration of the processing beam.

Furthermore, the measurement beam can be shifted to at least two additional measurement points in the direction of the main processing path in the third measurement position for detecting the maximum depth of penetration of the processing beam. In other words the measurement device may be equipped to scan a plurality of additional measurement points in the measurement position essentially parallel to the main processing path. The reason for this is that the curvature of the steam capillary depends on the rate of advance and/or additional parameters of the processing operation as well as those of properties of the workpiece to be machined so that the maximum depth of penetration of the processing beam must be determined in the steam capillary and its position must be determined.

In another embodiment, a light intensity of the measurement beam source may be variable as a function of the measurement points. More specifically, the illumination intensity can be variable as a function of the measurement points inside a measurement position and/or as a function of measurement points between the different measurement positions. The latter thus means that illumination intensity can also be varied as a function of the different measurement points.

Furthermore, in particular at the start of carrying out position measurements, the individual measurement points can first be scanned with different illumination intensities of the measurement beam. Then, from the measured data thus obtained, the measurement device can determine the optimal illumination intensity in each case for the individual measurement points in the different measurement positions and can save a corresponding correction value for the respective measurement points from the standpoint of the following measurements.

The measurement beam source may additionally have a lower illumination intensity when the measurement beam is directed at one of the measurement points in the area of the main processing path and may have a high illumination intensity when the measurement beam is directed at one of the measurement point in an area at a distance from the main processing path. Such an adjustment of the illumination intensity of the measurement beam source may be necessary in particular when a highly reflective solder, such as a copper solder is used in processing the workpiece. This solder reflect the measurement beam to a much greater extent than the surrounding workpiece surface, which is why a measurement beam with a lower intensity accordingly may be provided for scanning in the area of the solder.

Likewise, a dynamic adjustment of the illumination intensity may be advantageous for performing position measurements on fillet welds. In the area of the fillet weld, the measurement beam is reflected to a greater extent than in the surrounding area of the workpiece surface, which is why a measurement beam with a lower intensity accordingly may be provided for scanning in the immediate vicinity of a fillet weld.

Furthermore, depending on the instantaneous position of the measurement beam on the workpiece, the amount of light reflected by the reference arm, i.e., the reference measurement beam being reflected may also be altered. In the case of shallower angles of incidence, a smaller amount of the measurement beam is reflected to the measurement device, which is why it makes sense in this case to also reduce the illumination intensity of the reference measurement beam coming from the reference arm.

Thus the illumination intensity of the measurement beam and/or the illumination intensity of the reference measurement beam may be variable as a function of the measurement points.

In another embodiment of the invention, the measurement device may be set up to shift the measurement beam as a function of the instantaneous processing information. In this way, the measurement beam may be adapted dynamically and in a flexible manner to the instantaneous processing operation. The measurement beam may be displaceable between the measurement positions and/or to the measurement points as a function of the instantaneous processing information. For example, the exact direction across the direction of the main processing path may be predetermined as a function of the instantaneous processing information. Furthermore, the number of measurement points and thus the resolution in scanning and the distance between the measurement positions may be predetermined as a function of the processing information. The number of measurement points may also be adjusted to the instantaneous processing information. This is appropriate, for example, in processing with different processing directions, for example, with a scanner or a robot guided processing lens.

The processing information may include information about the processing direction and/or the processing speed. Thus the processing information may relate to the instantaneous relative movement between the processing device and the workpiece during the processing period. The measurement device according to another embodiment of the invention may include a reception unit which receives the processing information in the form of field bus data or sensor data. The respective processing information may be received by the receiving unit of the measurement device and made available, for example, by the processing devices, a robot that includes the processing device, a control unit between the robot and the measurement device and/or at least one sensor such as, for example, an acceleration sensor, a gyrosensor or the like. Tool center point (TCP) coordinates of a robot guiding the processing device and/or a motion vector of the TCP may also be received by the measurement device. The measurement device may also have at one control unit to further process the processing information accordingly.

In a refinement of the invention, the measurement device may have a memory unit wherein the measurement device can store measured values in the memory unit and wherein the memory unit can store a plurality of measured values in a data packet. In particular, a spectrometer of the optical coherence tomograph of the measurement device may generate a spectrogram and store it in an external memory of the spectrometer. The spectrogram may then be forwarded to a computer unit, which performs a Fast Fourier Transform (FFT) and stores the data obtained therefrom in a memory unit of the measurement device. A great deal of data may be stored in a data packet, which may contain 32,535 measurement points, for example. Such data pockets may then be sent via an Ethernet-based field bus to a separate evaluation unit, which processes the data further to detect the position of an edge or a butt seam or the quality of the weld, for example. According to the invention, the measured data thereby detected from a scanning figure, which is detected by scanning the measurement points in the first and second measurement positions or in the first, second and third measurement positions and transfer them to a data packet. For transferring data packets to an evaluation unit, the measurement device may also have a transmission unit.

Furthermore, the measured values may be recorded so they can be played back at a later point in time, analyzed and/or the algorithms tested. Furthermore, recorded measured values may also be visualized live during the recording.

In a refinement of the invention, the measurement beam may be shifted at a first rate to the measurement points in the respective measurement position, this position being greater than a second rate at which the measurement beam can be shifted in the direction of the main processing path between the measurement positions. It is possible in this way to ensure that high-resolution scanning is achieved, in which the measurement beams is shifted to a plurality of measurement points while the second rate is selected so that sufficiently rapidly shifting is ensured between the measurement positions. Since the number of measurement positions is always far lower than the number of measurement points even with a relatively low measurement resolution and a displacement of the measurement beam to more than two and/or three measurement positions, efficient scanning is ensured by using two different rates.

According to another embodiment according to the invention, the measurement device may include at least one displaceable first collimation lens through which the measurement beam passes such that the first collimation lens can be shifted transversely to the optical axis of the measurement beam in order to shift the measurement beam between the measurement positions. The optical axis of the measurement beam relates essentially to the optical axis of the measurement beam in passing through the first collimation lens.

The advantage here is that an optical component that is present anyway in the beam path of the measurement beam is easily shifted for shifting the measurement beam in order to deflect the measurement beam and thus shift it into the various measurement positions. This permits a shifting of the measurement beam to the various measurement positions in the direction of the main processing path without significantly increasing the complexity of the structure of the device.

Furthermore, shifting of the measurement beam by means of the first collimation lens in comparison with shifting the measurement beam by means of one or more oscillating mirrors and/or galvanic mirrors has a cost advantage because galvanic mirrors are usually expensive. Furthermore, the scanning rate in particular in the case of large mirrors is limited due to the physical properties. This can result in a limited measurement resolution and thus an inadequate acquisition of measured data from a measurement range. Furthermore, oscillating mirrors and/or galvanic mirrors have a relatively great need for space, which can lead to an unwanted interference contour in the case of an arrangement of the area of the processing head of a processing device. Furthermore, an arrangement of oscillating mirrors and the respective galvanic motors necessitates a comparatively complicated adjustment because of the high structural complexity in order to ensure the most accurate possible shifting of the measurement beam on the workpiece. Shifting of the measurement beam by means of a shiftable collimation lens thus also has structural advantages.

It is self-evident that, in addition to passing through the first collimation lens, the measurement beam may also pass through additional optical components and/or be reflected by them before striking the workpiece surface of the workpiece.

Since the measurement beam can become longer due to the displacement, it may have to be refocused accordingly. The first collimation lens may therefore be designed to be essentially displaceable in the beam direction of the measurement beam.

In a refinement of the invention, it is possible to provide that the first collimation lens can be shifted in a translatory moment along a first displacement axis in order to shift the measurement beam into the measurement positions. By varying the displacement path of the first collimation lens, the distance between the measurement positions can be varied. In particular, the distance of the first and second measurement positions from the intended instantaneous processing position can thus be determined. It is therefore possible, depending on the need to perform measurement in an ambient area close to the actual processing position or at a relatively great distance from the actual processing position. The distance between the different measurement positions may be different from one another or may correspond to one another.

In another embodiment of the invention, at least the first collimation lens may be displaceable by means of an actuator. The actuator may be designed as a linear actuator which causes a translatory displacement of the first collimation length along the first displacement axis. The actuator may have a rotational drive or linear drive, wherein a rotational movement of the rotational drive is transferred by the mechanism of the actuator in the form of a linear movement to the collimation lens.

According to the refinement described above, the actuator may also be designed in the form of a pneumatically operable actuator, a piezoelectrically operable actuator or an electromagnetically operable actuator. Furthermore, for example, two or three electromagnetics may be provided, wherein the first collimation lens can be shifted into at least two or three measurement positions by targeted energization of the electric magnets.

According to the invention, the first collimation lens may also be supported by a solid-state joint or a linear bearing. The linear bearing may be designed in the form of a linear roller bearing or a linear slide bearing. A relatively simple structural design for shifting of the measurement beam can be achieved through this embodiment. According to another embodiment of the invention, the first collimation lens may be displaceable by a translatory motion along a second displacement axis transversely to the optical axis of the measurement beam in order to shift the measurement beam transversely to the direction of the main processing path. The first displacement axis differs from the second displacement axis, so that the first collimation lens can be shifted in different directions transversely to the optical axis of the measurement beam. The optical axis of the measurement beam here refers again to the area of passage through the first collimation lens. The first and second displacement axes may be situated at a 90° angle to one another, for example. However, a different position of the second displacement axis with respect to the first displacement axis is also possible so that different scanning directions are adjustable for scanning the measurement points across the direction of the main processing path.

Another embodiment of the invention provides that the measurement device may include at least one displaceable additional optical component through which the measurement beam passes or which reflects the measurement beam to displace the measurement beam at least transversely to the direction of the main processing path. The measurement beam may be displaceable in the direction of the main processing path in the third measurement position. The additional optical component may be arranged downstream from the first collimation lens. This means that the additional optical component may be arranged in the beam path of the measurement beam between the first collimation lens and the workpiece. The measurement beam may thus be deflected first by the first collimation lens and then by the additional optical component and is thereby displaceable on a workpiece surface. The additional optical component may also permit faster displacement of the measurement beam than the first collimation lens.

According to another refinement of the invention, the additional optical component may be an additional collimation lens. This additional collimation lens may be displaceable translationally along a third displacement axis transversely to the optical axis of the measurement beam. The third displacement axis here has an orientation which is different from that of the first displacement axis. The third displacement axis may be arranged in a displacement plane which is essentially parallel to the displacement plane of the first displacement axis.

Furthermore, a refinement of the invention provides that the additional collimation lens may be arranged eccentrically on a rotary carrier. The axis of rotation of the rotary carrier may be essentially coaxial or parallel with the optical axis of the measurement beam in the area of the passage. Depending on the rotational position of the additional collimation lens arranged eccentrically on the carrier, the measurement beam may be displaced on respective measurement positions to different measurement points. More specifically, the measurement beam in the respective measurement positions may be displaced on the workpiece surface along a circular path or along an arc of a circle by means of an additional collimation lens arranged in this way. Scanning of the workpiece surface can thus be performed along a circular path in the respective measurement positions but efficient scanning can nevertheless be achieved due to the independent displacement of the measurement beam between the different measurement positions, for example, by means of the first collimation lens. The measurement beam therefore need not move along the circular path or an arc of a circle to move from one of the measurement positions into another measurement position.

According to an alternative embodiment of the invention, the additional optical component may be a rotary wedge plate. Here again, the axis of rotation of the wedge plate may be essentially coaxial or parallel to the optical axis of the measurement beam in the area of its passage. Due to the rotating wedge plate, scanning may be performed along a circular path or an arc of a circle on the workpiece surface in the respective measurement positions while the displacement between the respective measurement positions can be carried out independently of this. Due to the structural design of the nonplanar wedge plate surface, the radius of the circular path of the scanning can be defined.

According to another embodiment of the invention, the additional optical component may be a pivotable galvanic mirror. The galvanic mirror may be designed for pivoting about only one axis of pivot due to a prior deflection of the measurement beam, for example, by means of the displaceable first collimation lens. The pivot axis of the galvanic mirror may be oriented in such a way that the pivoting of the galvanic mirror shifts the measurement beam on the workpiece transversely to the direction of the main processing path.

An alternative embodiment provides that the additional optical component may be a rotary polygonal mirror having a plurality of mirror surfaces. The axis of rotation may be oriented transversely to the optical axis of the measurement beam. The polygonal mirror may be designed in such a way and arranged in the beam path of the measurement beam so that the measurement beam strikes a single mirror surface of the polygonal mirror. This mirror surface can deflect the measurement beam in the direction of a workpiece surface. By rotating the polygonal mirror about this axis of rotation, a different mirror surface of the polygonal mirror can be shifted into the beam path of the measurement beam. During the rotation of the polygonal mirror, the angle of the mirror surface deflecting the measurement beam changes continuously with respect to the measurement beam. The measurement beam can therefore be displaced by the polygonal mirror in the direction of the main processing path. Such a displacement by means of the polygonal mirror can also be provided in addition to displacement of the measurement beam between the measurement positions by means of another component of the measurement device. Scanning in the main processing path direction can thus also be made possible in the respective measurement positions.

Furthermore, the mirror surfaces of the polygonal mirror may each have an angle of inclination. The angle of inclination here describes an inclination of a mirror surface transversely to the optical axis of the measurement beam striking the mirror surface through which the measurement beam is shifted on the mirror surface essentially transversely to the direction of the main processing path.

Furthermore, at least two of the mirror surfaces may have different angles of inclination from one another. Depending on the mirror surface and/or the angle of inclination of the mirror surface, the measurement beam may thus be displaced to different amounts on the workpiece surface transversely to the direction of the main processing path. Due to the number of mirror surfaces, more specifically due to the number of different mirror surfaces introduced one after the other into the measurement beam, the number of measurement points in the respective measurement positions can be determined. It is also conceivable here to form irregular polygonal mirrors.

By controlling the rotational rate of the polygonal mirror, it is also possible to adapt the scanning frequency, i.e., the second rate of displacement of the measurement beam between the measurement points. It is thus possible by controlling the rotational rate and the structural design of the polygonal mirror more specifically the number of mirror surfaces and their respective angles of inclination to determine the resolution, the frequency and the range of scanning in each of the individual measurement positions.

For technical reasons pertaining to the manufacture, two opposite mirror surfaces of the polygonal mirror may have the same angle of inclination, which facilitates that of the polygonal mirror and may thus save on costs.

In a refinement of the invention, at least one of the mirror surfaces of the polygonal mirror may have an adjustable angle of inclination. The adjustable dangle of inclination may be adjustable by means of a controllable actuator. Furthermore, it is possible for all mirror surfaces of the polygonal mirror to be designed to be automatically or manually adjustable. Then the mirror surfaces may be adjustable completely independently of one another or depending on one another. This permits flexible adjustment of the scanning, for example, on the respective processing process without requiring replacement of the polygonal mirror to do so. Therefore, scanning and/or displacement of the measurement beam also can be varied during the processing operation.

Furthermore, the mirror surfaces of the polygonal mirror may also be designed to be automatically and/or manually adjustable with respect to adjacent mirror surfaces.

According to a refinement of the invention, the polygonal mirror may have at least two mirror planes each having a plurality of mirror surfaces which are axially adjacent to one another with respect to the axis of rotation. Furthermore, the polygonal mirror may also be axially displaceable along relative to the optical axis along the axis of rotation. Due to the displacement of the polygonal mirror along the axis of rotation, one of the mirror planes may be introduced into the region of the beam path of the measurement beam in at least some sections. The different mirror surfaces of the respective mirror plane may then be introduced one after another into the beam path of the measurement beam by rotation of the polygonal mirror about the axis of rotation. Such an arrangement makes it possible to supply a larger number of different mirror surfaces in comparison with a traditional polygonal mirror, so that the adaptability of the scanning can be further improved.

The invention also relates to a device for processing and/or welding a workpiece by means of a high energy processing beam in particular a laser beam which is movable relative to the workpiece along a predetermined main processing path. Here again the relative movement between the processing beam and the workpiece can be executable by moving the processing beam and/or the workpiece. In doing so the device includes a processing device having a processing beam source and a processing beam lens, a measurement device for carrying out position measurements on the workpiece by means of a measurement beam and a beam splitter for essentially coaxial coupling of the measurement beam with the processing beam. The measurement device here has the features of the measurement device according to the invention described above. According to the invention, performing position measurements here also relates to detection of measured data in an instantaneous measurement position of the measurement beam on the workpiece, wherein measured data can be detected in particular with height information, i.e., with topographic information about the workpiece surface in the respective instantaneous measurement position.

The measurement device provided in the device for processing a workpiece may also include any features or combinations of features of the refinements and/or embodiments of the measurement device according to the invention described above.

According to one refinement of the invention at least one part of the measurement device may be permanently connected to the processing device. In particular, a beam splitter, a measurement arm and a reference arm of the measurement device may be fixedly connected to the processing device. These components can be thereby carried along with the processing device so that the required lengths of the optical fibers of the measurement arm and of the reference ram can be minimized. This reduces possible interfering influences and improves the quality of the measurement process.

However, even with a fixed connection of one part of the measurement device with the processing device, relatively great changes in length of the measurement arm may occur due to unevenness and differences in height on a workpiece surface. For this reason the reference arm may be designed to be variable in length. To do so, for example, mirrors may be displaceable within the reference arm, so that the path length traveled by a reference measurement beam in the reference arm can be varied. As an alternative to that, instead of the length of the reference arm, the length of the measurement arm may be variable to counteract, for example, unevenness and height differences on the workpiece surface.

Since the reference arm is not to be readjustable as a function of an imaging scale but essentially must be varied by an actual change in length of the measurement arm in the beam direction, the reference arm would have to be very quickly readjustable for a continuous adjustment. This would require a great technical effort, which is why continuous readjustment of the reference arm is to be omitted in another embodiment of the invention. According to this additional embodiment, it may be assumed that the instantaneous processing position and/or the respective measurement position in the beam direction changes only slightly during a processing along a main processing path. Greater changes in beam direction occur essentially with a change to a different main processing path. Therefore in this additional embodiment, readjustment of the reference arm may be limited to the period of time during a change in the main processing path. The reference arm may be readjusted essentially all at once and/or in steps. Due to the change in the main processing path, more time is available for adjusting the length of the reference arm which is why it can be readjusted at a lower rate than in a continuous readjustment.

According to a refinement of the invention, the device for processing a workpiece may include an actuator which is equipped to displace at least the processing beam at least along the main processing path. Due to the coupling of the measurement device with the processing device and the essentially coaxial coupling of the measurement beam with the processing beam, the measurement beam may also be displaced by the actuator. Furthermore, the measurement beam can also be focused by the processing beam lens due to this coupling.

The actuator may be designed as a guidance machine which guides at least a portion of the processing device or the processing and measurement device along a programmable predetermined path. The guidance machine may be, for example, a robot or a portal system.

In an alternative embodiment of the invention, an optical component of the processing device may be designed to be displaceable. Thus, for example, the focus lens of the processing beam lens may be designed to be displaceable. A measurement beam which is coaxially coupled to the processing beam and also passes through the focus lens of the processing device may also be displaced by displacement of the focus lens. As an alternative, a collimation lens of the processing device or a fiber plug of the processing device may also be designed to be displaceable. Alternatively, the actuator may also be designed in the form of a movable mirror, for example, a galvanic mirror.

According to one refinement of the invention the component may also be displaceable with respect to the processing device. Therefore, the component may be arranged on an adjustable XY stage, for example.

The invention also relates to a method for carrying out position measurements by means of a measurement beam on a workpiece, in particular with a measurement device according to the invention, wherein the workpiece is provided for processing by means of a high energy processing beam which is moved along a predetermined main processing path relative to the workpiece, wherein the method comprises the steps:

generating a measurement beam by means of a measurement beam source of an optical coherence tomograph and displacement of the measurement beam within a predetermined measurement range on the workpiece, wherein the measurement beam is shifted into a first measurement position and a second measurement position by means of a measurement device, essentially in the direction of the main processing path during processing on the workpiece, such that the first measurement position is in front of an intended instantaneous processing position as seen in the direction of processing, and the second measurement position is behind the intended instantaneous processing position as seen in the direction of process. In addition, the method according to the invention includes the step:

displacement of the measurement beam in the at least first and second measurement positions transversely to the direction of the main processing path, so that a plurality of measurement points is scanned by means of the measurement beam transversely to the direction of the main processing path for detection of measured data in the area of the at least first and second measurement positions.

With respect to the method according to the invention, carrying out position measurements relates to detecting measured data at an instantaneous measurement position of the measurement beam on the workpiece so that in particular measured data with height information, i.e., with topographic information about the workpiece surface is detected at the respective instantaneous measurement position.

This method may also include the steps: shifting the measurement beam essentially in the direction of the main processing path into at least one third measurement position which is in the area of the intended instantaneous processing position, and shifting the measurement beam in the third measurement position essentially in the direction of the main processing path to at least two additional measurement points for detecting the maximum depth of penetration of the processing beam.

In another variant the method may also include the step: varying the illumination intensity of the measurement beam source as a function of the measurement points. A lower illumination intensity of the measurement beam source can be adjusted when the measurement beam is directed at a measurement point in the area of the main processing path, and a higher illumination intensity can be set when the measurement beam is directed at another measurement point in an area at a distance from the main processing path.

Furthermore, the measurement beam may be shifted as a function of the instantaneous processing information.

It is self-evident that the subject matter of the invention is not limited to the embodiments described above. The embodiments and features already described may be combined by those skilled in the art in any desired way without deviating from the subject matter of the invention.

BRIEF DESCRIPTION OF THE DRAWINGS

Preferred embodiments of the invention are described in greater detail below on the basis of the accompanying schematic drawings, in which.

DETAILED DESCRIPTION OF THE INVENTION

Figure 1:
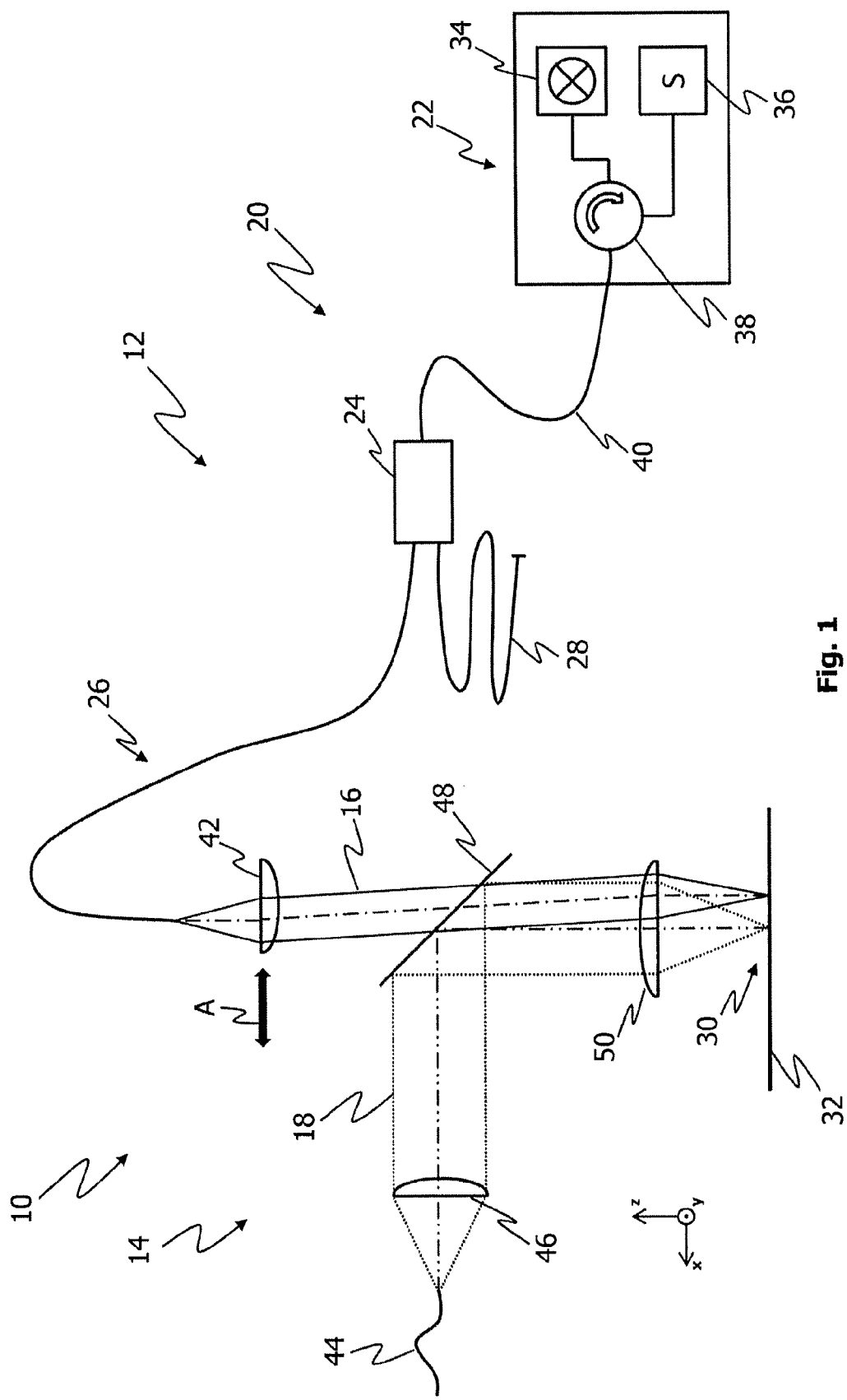
FIG. 1 shows a device with a processing device and a measurement device according to a first embodiment of the invention.

FIG. 1 shows a device according to the invention in a first embodiment, which is labeled as 10 in general. The device 10 includes a measurement device 12 and a processing device 14. The measurement device 12 is coupled to the processing device 14 so that a measurement beam 16 of the measurement device 12 is superimposed at least partially on a processing beam 18 of the processing device 14. The measurement device 12 includes an optical coherence tomograph 20 (OCT) with an OCT measurement device 22 which is connected to a measurement arm 26 and a reference arm 28 by means of a beam splitter 24.

The beam splitter 24 of the optical coherence tomograph 20 is permanently connected to the processing device 14 (not shown). Therefore, the beam splitter 24, the transport fiber of the measurement arm 26 and of the reference arm 28 are guided essentially jointly with the processing device 14 along a main processing path 30 on the workpiece 32. This has the advantage that the required lengths of the transport fibers of the measurement arm 26 and of the reference arm 28 are minimized. Furthermore, the length of the measurement arm 26 can be kept relatively constant during a processing operation along a main processing path which minimizes the respective required adjustment of the length of the reference arm 28.

The OCT measurement device 22 includes a measurement beam source and/or a measurement light source 34 for generating a measurement light with a wavelength in the range of 830 nm and a spectrometer 36 for detecting a superimposed measurement beam.

The measurement light is split by the beam splitter 24 into the measurement beam 16 and a reference beam (not shown). The beam splitter is therefore designed as a 90/10 beam splitter of the type shown in FIG. 1. This means that the beam splitter delivers 90% of the measurement light as the measurement beam to the measurement arm and thus in the direction of the workpiece while 10% of the measurement light is emitted as the reference beam to the reference arm. Due to this ratio, despite diffuse reflection of the measurement beam 16 on the surface of the workpiece 32 it is possible to ensure that the reflected measurement beam will have a sufficient intensity for subsequently being superimposed and analyzed. For further adjustment of the intensities of the measurement beam and the reference measurement beam, additional optical components such as apertures, for example, may be provided in the reference arm 28 and/or the measurement arm 26.

In addition, the OCT measurement device 22 includes a circulator 38 which connects the beam splitter 24 by a transport fiber and/or a light guide 40 optionally to the measurement light source 34 or the spectrometer 36. In this way measurement light from the measurement beam source 34 can be guided to the beam splitter 24 via the circulator 38 on the one hand while on the other hand reflected and superimposed measurement beam from the beam splitter 24 can be sent to the spectrometer 36 via the circulator 38.

The measurement device 12 additionally includes a shiftable first collimation lens 42 which is arranged essentially between the transport fiber on the measurement arm 26 and the workpiece 32 in the measurement arm. Measurement beam 16 therefore passes through the collimation lens 42 before being input into the processing device 14. The collimation lens 42 can be shifted in a translatory motion along a first displacement axis essentially transversely to the optical axis of the measurement beam 16, which is indicated by the double arrow A. The measurement beam 16 can be shifted to different measurement positions by the shifting of the first collimation lens 42 on the workpiece 32 in the direction of the main processing path 30, as will be discussed in greater detail below. However, as an alternative to the first collimation lens 42, another optical component through which the measurement beam 16 passes and/or which reflects the measurement beam 16 may also be provided in order to shift the measurement beam 16 on the workpiece 32 in the direction of the main processing path 30 to different measurement positions.

The processing device 14 shown here includes a transport fiber 44 for the processing beam 18, wherein the transport fiber 44 is connected to a processing beam source (not shown). This generates the processing beam 18 with a wavelength in the range of 1064 nm. In addition, the processing device 14 include a processing beam collimation lens 46 for parallelizing the processing beam 18, a beam splitter 48 in the form of a dichromatic mirror which is arranged in the beam path of the processing beam 18 and the focusing lens 50 for focusing the processing beam 18 in a predetermined instantaneous processing position on the workpiece 32. The dichromatic mirror 48 in this example has a 99% transmission of radiation with a wavelength in the range of 830 nm and a 99.7% reflection of radiation with wavelengths in the range of 1064 nm. However, the use of a beam splitter 48 with properties that deviate from these values is also possible, such that the beam splitter 48 is to be designed from the standpoint of the wavelength of the measurement beam 16 and that of the processing beam 18. In the present embodiment, the beam splitter 48 is provided for reflection of the processing beam 18 and therefore is arranged in the beam path of the processing beam 18 in such a way that, with the arrangement shown here, the processing beam 18 is deflected by the beam splitter 48 by 90% in the direction of the workpiece surface to be processed.

The measurement device 12 is coupled to the processing device 14 in such a way that the measurement beam 16 leaving the transport fiber of the measurement arm 26 first passes through the first collimation lens 42 and then is input via the beam splitter 48 into the processing beam 18 and/or is at least partially superimposed thereon. Then the measurement beam 16 also passes through the focus lens 50 of the processing beam lens system of the processing device 14 so that the measurement beam 16 is focused on the workpiece 32 in a measurement point. By shifting the first collimation lens 42 transversely to the optical axis of the measurement beam 16, the measurement beam 16 is deflected in such a way that it can be shifted essentially in the direction of the main processing path 30 into various measurement positions (not shown in FIG. 1). Since the measurement beam 16 can be lengthened by the deflection described here it must be refocused under some circumstances by shifting the collimation lens 42 in the direction of the measurement beams. For this purpose the collimation lens 42 is also designed to be shiftable in the direction of the measurement beam (not shown).

The processing device 14 and/or the processing beam 18 is/are guided by means of an actuator (not shown) along the main processing path 30 over the workpiece 32. Alternatively, however, the workpiece 32 may also be moved relative to the processing device 14. The processing beam 18 then creates a weld pool in the instantaneous processing position on the workpiece 32 in a known manner for processing and/or welding the workpiece 32 to another workpiece (not shown in FIG. 1). By coupling the measurement device 12 to the processing device 14, at least the measurement beam 16 and/or a portion of the measurement device 12 is/are guided with the processing beam 18 and/or the processing device 14 along the main processing path 30. This ensures that the instantaneous measurement position of the measurement beam 16 is always located in the ambient area of the intended instantaneous processing position of the processing beam 18.

The measurement beam source 34 of the OCT measurement device 22 creates measurement light which is directed to the beam splitter 24 via the circulator 38 and the transport fiber 40. The beam splitter 24 splits the measurement light into the measurement beam 16 and the reference measurement beam and directs 90% of the measurement light a measurement beam 16 to the measurement arm 26 while 10% of the measurement light is relayed as a reference measurement beam to the reference arm 28. The measurement beam 16 leaves the transport fiber of the measurement arm 26 and passes through the first collimation lens 42, the beam splitter 48 and the focus lens 50, striking an intended measurement position on the workpiece 32 depending on the deflection by the shifted collimation lens 42. The measurement beam 16 is reflected by the workpiece surface in the respective measurement position, whereupon a reflected measurement beam component is input back into the measurement device 12 and/or the measurement arm 26 by way of the focusing lens 50, the beam splitter 48 and the collimation lens 42. At the same time the reference measurement beam is reflected by a mirror in the reference arm 28 in a known way and sent back to beam splitter 24.

The length of the reference arm 28 is variable, so that the measurement beam 16 and the reference measurement beam travel essentially the same distance. The reflected measurement beam and the reflected reference measurement beam are superimposed in the beam splitter 24 and are relayed further to the spectrometer 36 by way of the transport fiber 40 and the circulator 38. The spectrometer 36 detects the interference of the reflected measurement beam and the reflected reference measurement beam and can determine the distance traveled by the measurement beam 16 by taking into account the existing length of the reference arm 28. Depending on which measurement position the measurement beam 16 is in during the measurement on the workpiece, height information about the workpiece surface and/or about the depth of penetration of the processing beam 18 into the workpiece 32 can be detected.

Furthermore, it is possible by means of a readout unit to read out information from other components of the device 10 such as the shifting of the collimation lens 42 or of the actuator. This allows an accurate determination of the instantaneous position of the measurement beam 16 on the workpiece surface in the XY direction shown in FIG. 1. Therefore, three-dimensional surface profiles can be detected in certain measurement areas so that the processing operation can be monitored accurately.

Figure 2:
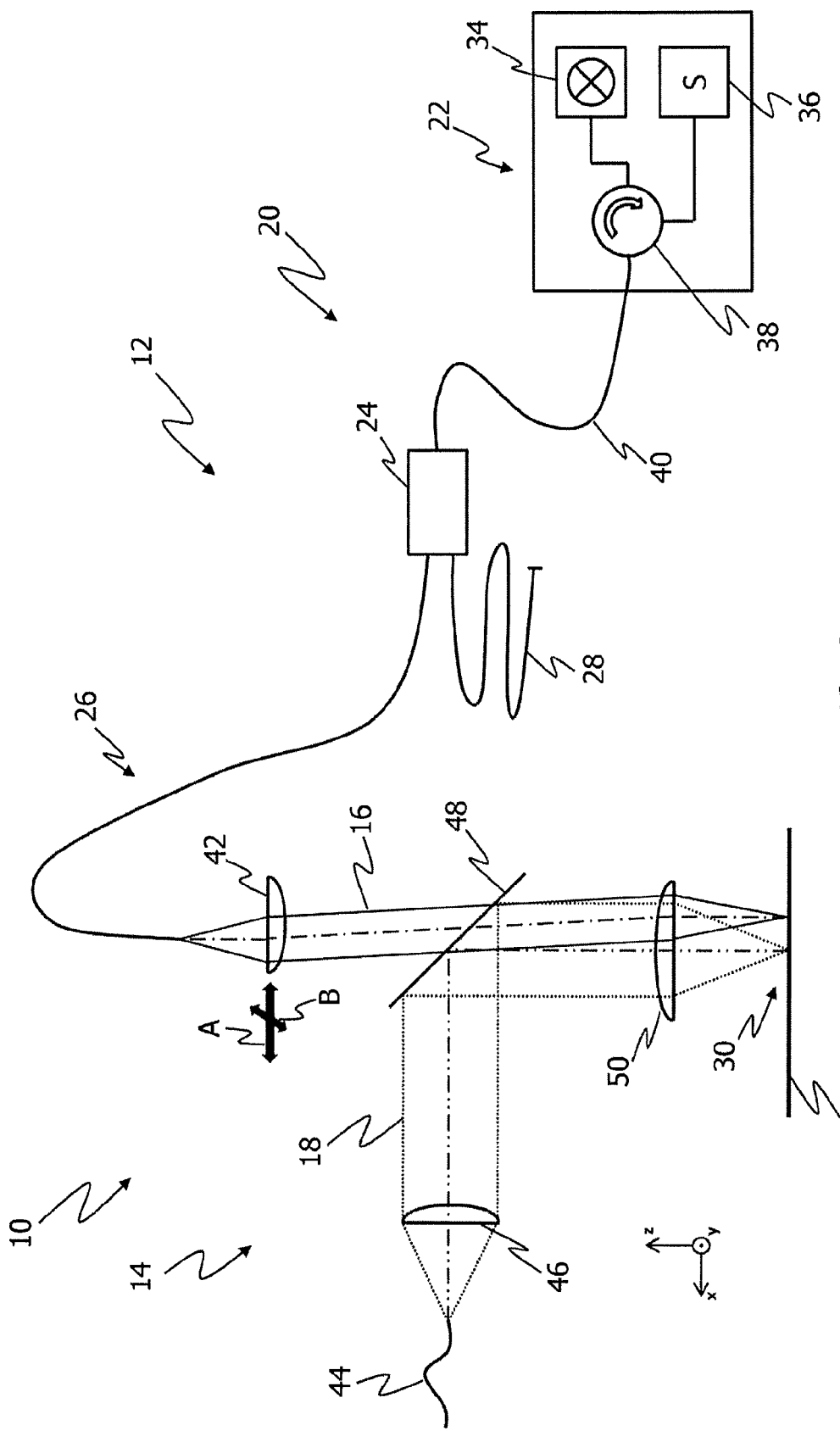
FIG. 2 shows a device with a processing device and a measurement device according to a second embodiment of the invention.

FIG. 2 shows a second embodiment of the invention, which corresponds essentially to the arrangement according to FIG. 1, but only the differences between the two embodiments will be discussed here. The first collimation lens 42 in the second embodiment shown in FIG. 2 is additionally shiftable in a translatory fashion along a second displacement axis transversely to the optical axis of the measurement beam 16 which is indicated by the double arrow B. This permits an additional deflection of the measurement beam 16 so that this is also shiftable on the workpiece 32 across the direction of the main processing path. Depending on the intended scanning of the workpiece 32, the collimation lens 42 can be shifted much more rapidly along the first or second displacement axis than along the other displacement axis.

Due to this additional possible shifting of the collimation lens 42 along the second displacement axis, scanning of an array of measurement points on the workpiece is thus possible on the whole. In each measurement position to which the measurement beam 16 is aimed by the shifting of the first collimation lens 42 along the first displacement axis, it is thus possible to scan a plurality of measurement points transversely to the main processing path 30. This permits a two-dimensional shifting of the measurement beam 16 on the workpiece surface by means of a shifting of the first collimation lens 42 along the first and second displacement axes. A faster displaceability of the collimation lens 42 along the second displacement axis (double arrow B) in the embodiment shown here makes possible a measurement with a high resolution transversely to the direction of the main processing path 30. However, a slower displaceability of the collimation lens 42 along the first displacement axis (double arrow A) is nevertheless sufficient for an appropriate alignment of the measurement beam 16 with different measurement positions and thus permits an efficient scanning process.

It should be pointed out that in an alternative embodiment, instead of a first collimation lens that can be shifted in two directions, two collimation lenses arranged one after the other may also be provided. Then the additional collimation lens by either be shiftable in a translatory fashion along the second displacement axis or may be arranged eccentrically on a rotary carrier in order to additionally deflect the measurement beam 16.

Figure 3:
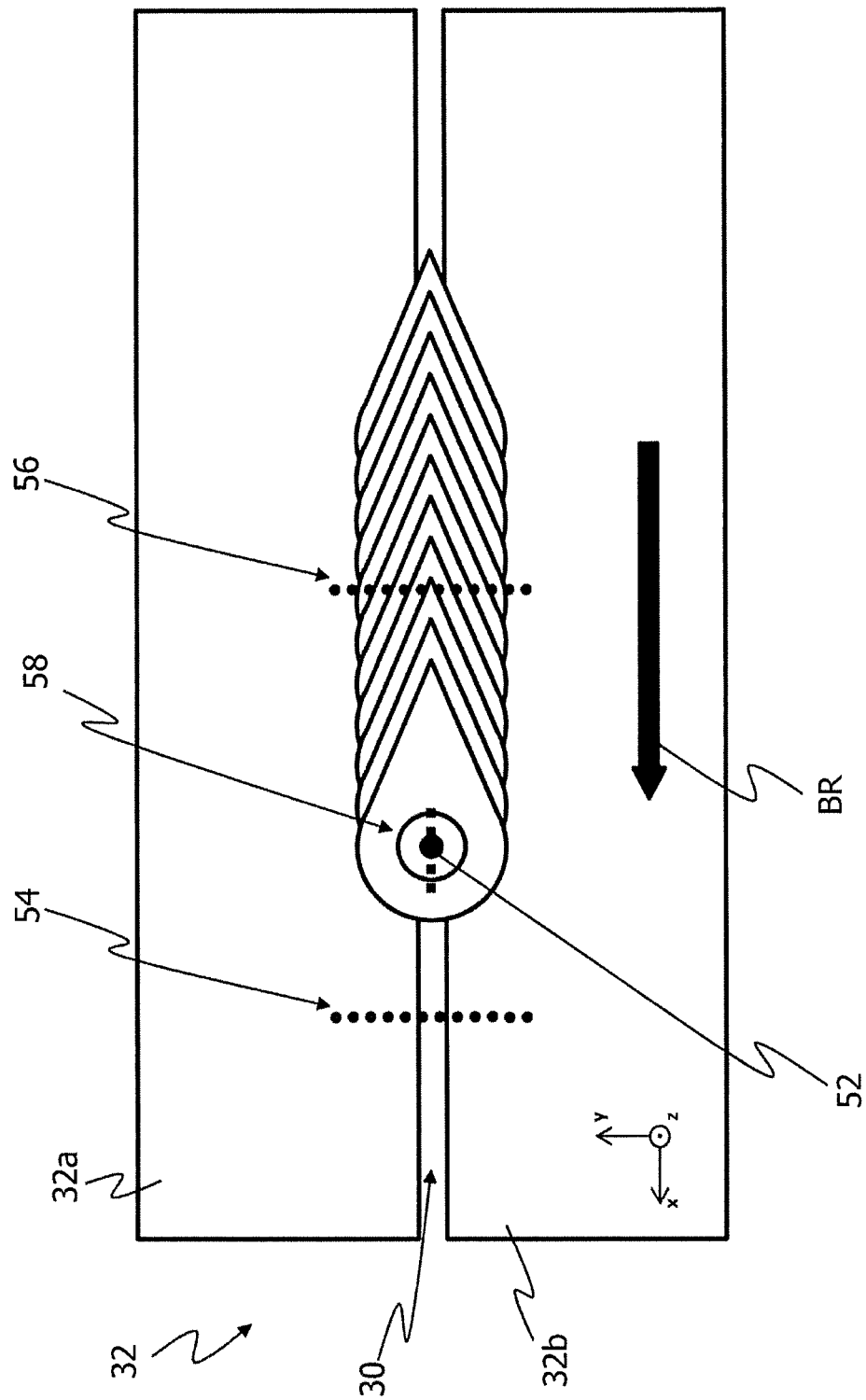
FIG. 3 shows measurement positions and measurement points on a workpiece according to the invention.

FIG. 3 shows a top view of a partially machined workpiece 32 which includes the individual workpiece parts 32a and 32b. The main processing path 30 runs along a gap between the workpiece parts 32a and 32b in the X direction and has already been partially processed in the diagram shown here, i.e., closed with a weld. The processing beam (not shown) is moved in the processing direction BR along the main processing path 30. In the area of the instantaneous processing position 52 of the processing beam 18, A steam capillary with a surrounding weld pool is created by the processing beam so that the surrounding regions in the workpieces 32a and 32b are melted and welded together. The weld that is already cooled can be discerned behind the instantaneous processing position 52 as seen in the direction of processing BR.

FIG. 3 also shows three measurement positions 54, 56, 58 in each of which a plurality of individual measurement points is shown. The first measurement position 54 lies in the direction of the main processing path 30 in front of the instantaneous processing position 52 (pre) as seen in the processing direction BR, while the second measurement position 56 lies behind the instantaneous processing position 52 (post) as seen in the processing direction BR, and third measurement position 58 lies in the area of the instantaneous processing position 52 (in). This means that the first measurement position 54 lies in the area of the main processing path 30 which has not yet been processed, and a second measurement position 56 lies in the area of the main processing path 30 which has already been processed, i.e., in the area of the cooled weld. As this also shows the individual measurement points in the first and second measurement positions 54, 56 are each scanned transversely to the direction of the main processing path 30 so that, for example, measured data can be detected over the entire width of the main processing path 30 and/or weld to be processed. As can also be seen, the measurement points in the third measurement position 58 are scanned in the direction of the main processing path 30, however, in order to detect the maximum depth of penetration of the processing beam 18.

The measurement positions 54, 56, 58 shown here are spaced a distance apart from one another, and no measurement points are scanned between the measurement positions 54, 56, 58 to shift the measurement beam 16 from one of the measurement positions 54, 56, 58 into another measurement position 54, 56, 58. The measurement beam 16 is shifted between the measurement positions 54, 56, 58 and to the plurality of measurement points in the respective measurement positions, this being accomplished by means of the measurement device 12 during the processing of the workpiece 32.

The measurement points shown in FIG. 3 are each arranged along a line running essentially orthogonally to the main processing path 30 between the first and second measurement positions 54, 56. The width of the scanning across the direction of the main processing path 30 is adjusted so that, in the second measurement position 56, the total width of the cooled weld is scanned, and in the first measurement position 54, approximately the entire width of the area where a weld pool is subsequently formed during processing is scanned.

In the additional embodiments of the invention described below, the same reference numerals are used for comparable components and/or those having the same effect as in the embodiments already described. The components and features which are not described anew in the additional embodiments resemble in design and function the corresponding components of the present embodiments according to FIGS. 1 to 3. For this reason, the main differences between the embodiments will be discussed below.

Figure 4:
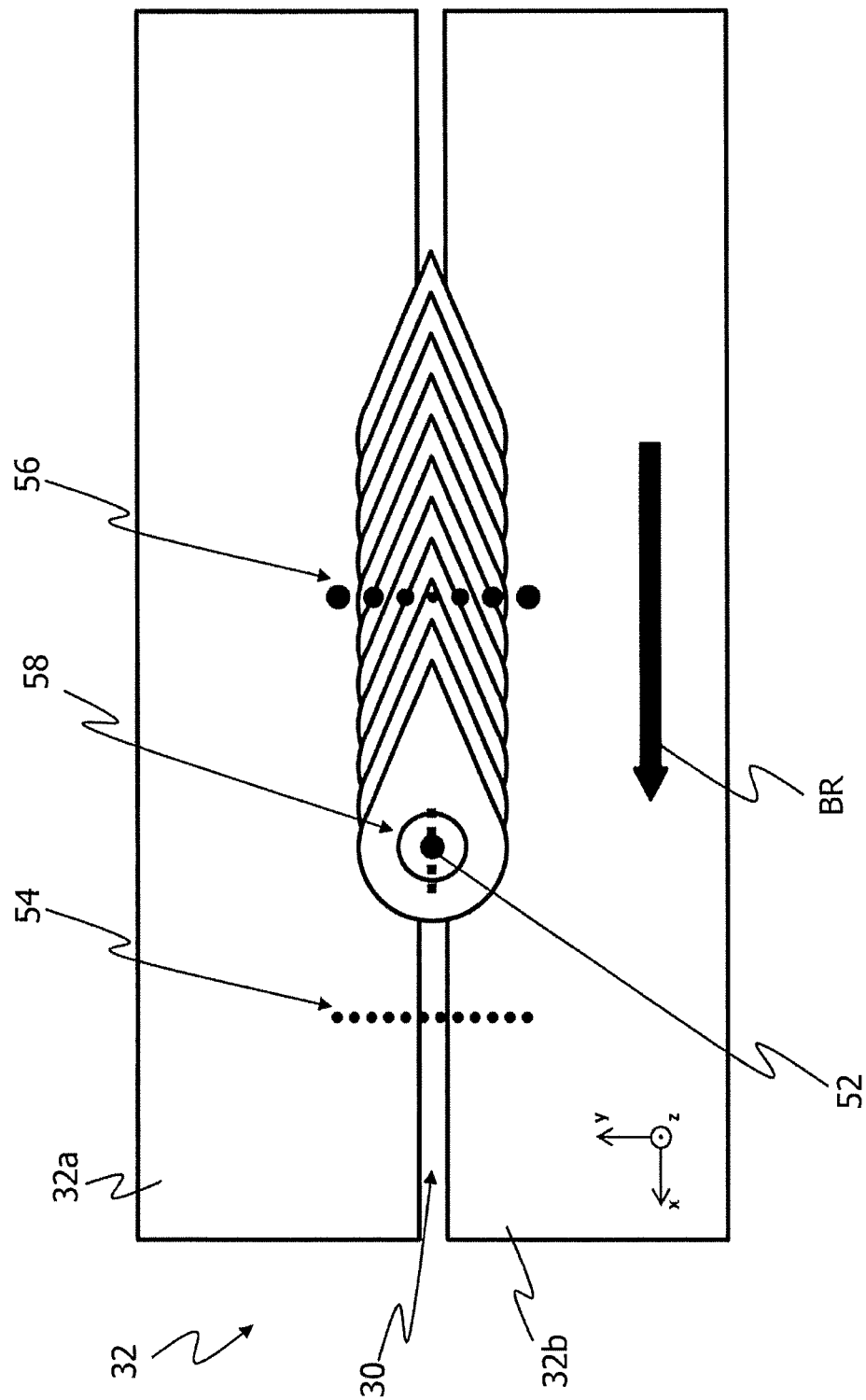
FIG. 4 shows measurement positions and measurement points with different illumination intensities on a workpiece according to the invention.

FIG. 4 shows a top view of a partially processed workpiece 32 according to FIG. 3, wherein the individual measurement points in the second measurement position 58 have different illumination intensities, for example. The measurement points lying closer to the main processing path 30 have a lower illumination intensity than the measurement points at a greater distance from the main processing path 30. At the center of the weld, the measurement beam 16 is reflected better because of the solder agent used according to the present invention than in the edge regions and/or in the regions of the workpiece surface at the side of the weld.

Figure 5:
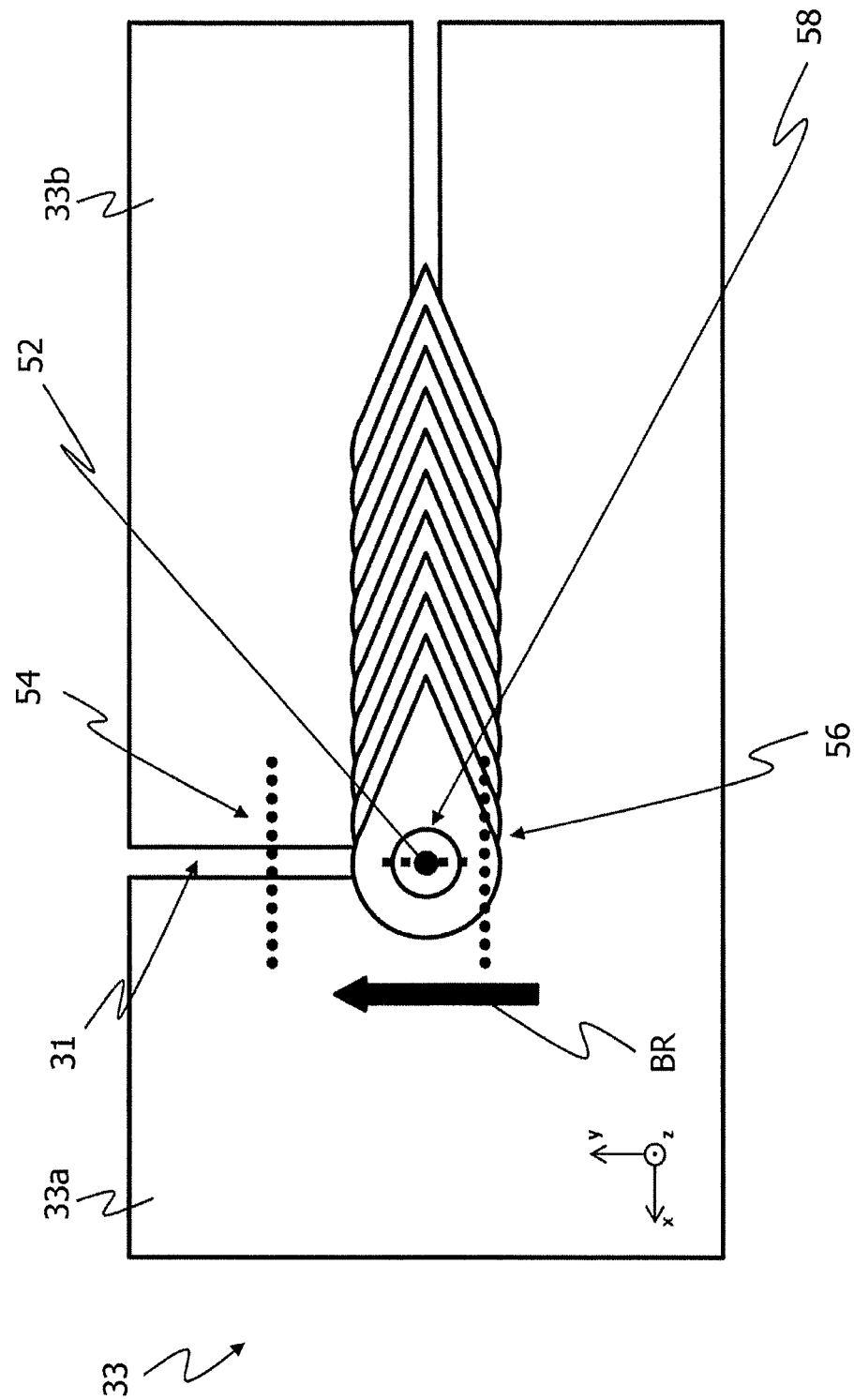
FIG. 5 shows measurement positions and measurement points according to the invention as a function of processing information on a workpiece.

In addition, FIG. 5 shows a top view of a partially processed workpiece 33 comprising the individual workpiece parts 33a and 33b. The main processing path 31 shown in FIG. 5 shows a change in direction, so that the processing direction BR of the processing beam is also varied during processing in order to follow the main processing path 31. The instantaneous processing direction BR in FIG. 5 is 90° offset from the area of the workpiece 33 that has already been processed and is thus different from the previous processing direction. In the diagram shown here, the measurement positions 54, 56, 58 are adapted to the instantaneous processing direction BR as a function of the processing information, such that, in a first measurement position 54, an inventive scanning of measurement points in the direction of the main processing path 31, as seen in the direction of processing BR, in front of the instantaneous processing position 52, is also made possible, and in a second measurement position 56, behind the instantaneous processing position 52 in the direction of the main processing path 31, as seen in the processing direction BR, and in a third measurement position 58, in the area of the instantaneous processing position 52.

The change in the scanning and/or alignment of the measurement beam shown in FIG. 5 as a function of the instantaneous processing information is made possible, for example, by the fact that the displaceability of the collimation lens 42 described with respect to FIG. 2 along the first and second displacement axes (double arrows A and B in FIG. 2) is used in the opposite sense or direction accordingly. In other words, the measurement beam is shifted between the measurement positions 54, 56, 58 by shifting the collimation lens 42 along the second displacement axis (double arrow B) after changing the processing direction BR and then by shifting the collimation lens 42 along the first displacement axis (double arrow A) the measurement beam is shifted to the individual measurement points transversely to the direction of the main processing path 31. However, as an alternative to this, it is also possible to rotate the measurement device 12 to shift the measurement beam 16 as a function of the instantaneous processing information and/or to adjust the other components of the measurement device 12 accordingly.

For an overview, the optical coherence tomograph 20 of the measurement device 12 is indicted in the other embodiments shown merely by the measurement arm 26. The design, which is not shown, however, corresponds to the design shown in FIG. 1. Furthermore, the functioning of the additional embodiments which is explained below will be described with respect to processing and measurement of the workpiece 32 shown in FIG. 3 with the main processing path 30.

Figure 6:
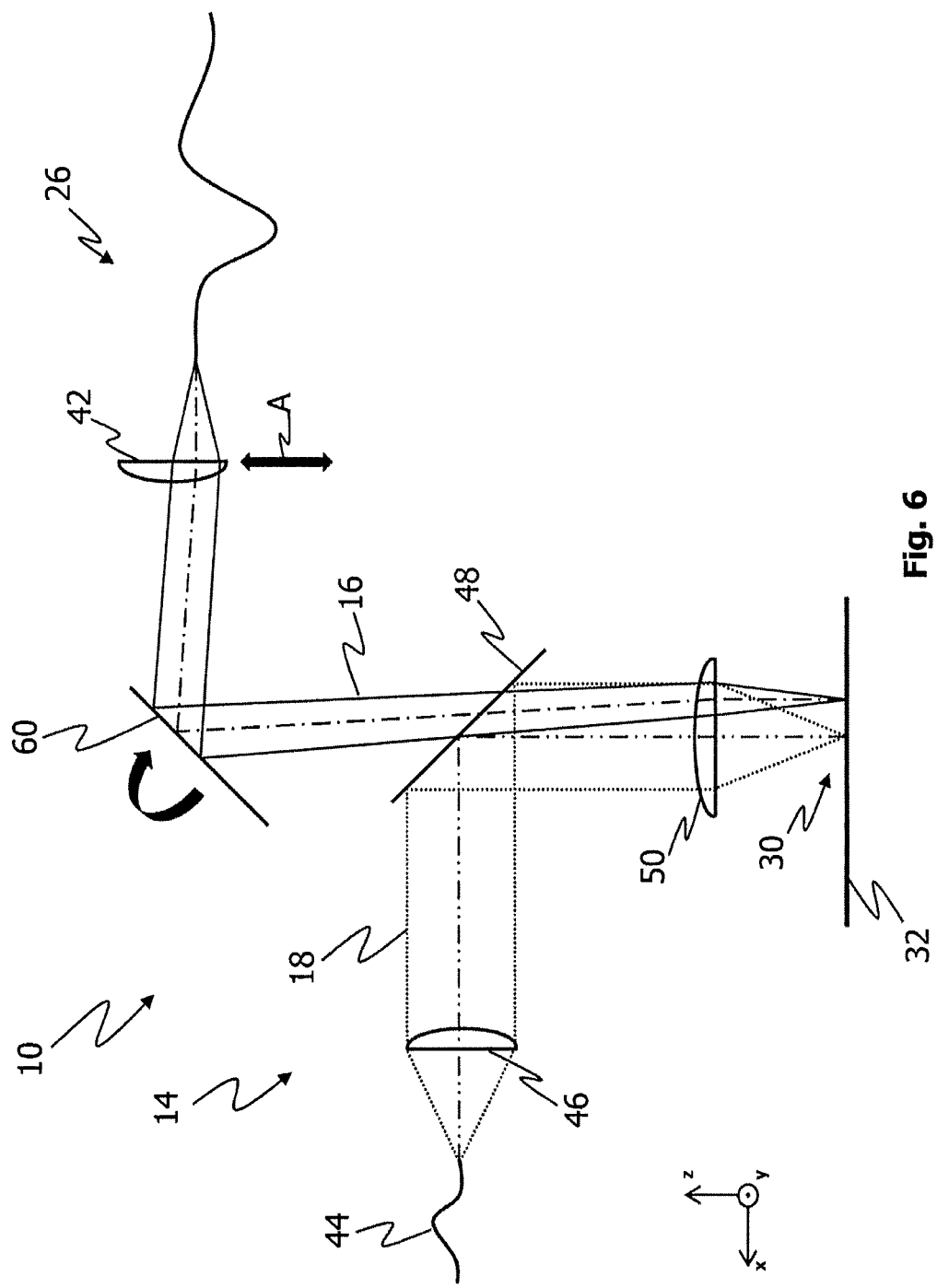
FIG. 6 shows a detail of a device with a measurement device and a processing device according to a third embodiment of the invention.

In addition to the components of the device 10 that have already been described, FIG. 6 also shows a movable galvanic mirror 60, which can be pivoted about a pivot axis. The galvanic mirror 60 is provided downstream from the collimation lens 42 in the beam path of the measurement beam 16, so the measurement beam 16 strikes the galvanic mirror 60 before the measurement beam is input into the processing device 14. The galvanic mirror 60 deflects the measurement beam 16 in the arranged shown here in the direction of the workpiece 32.

The galvanic mirror 60 is designed to be pivotable in such a way that pivoting of the galvanic mirror 60 shifts the measurement beam 16 on the surface of the workpiece 32 transversely to the direction of the main processing path 30, wherein the respective measurement position is predetermined by the shift in the collimation lens 42. Thus, the galvanic mirror 60 shifts the measurement beam 16 to different measurement points by pivoting into the respective measurement positions, so that scanning of a measurement area on the workpiece is made possible. Due to the galvanic mirror 60 the measurement beam 16 can be shifted transversely to the direction of the main processing path 30 at a higher rate than through the collimation lens 42 in the individual measurement positions. Therefore, a rapid scanning in the individual measurement positions can be achieved while nevertheless permitting an inexpensive and compact design because only one galvanic mirror is provided. Nevertheless a two-dimensional scanning of the workpiece surface is made possible due to the shiftable collimation lens 42.

Figure 7:
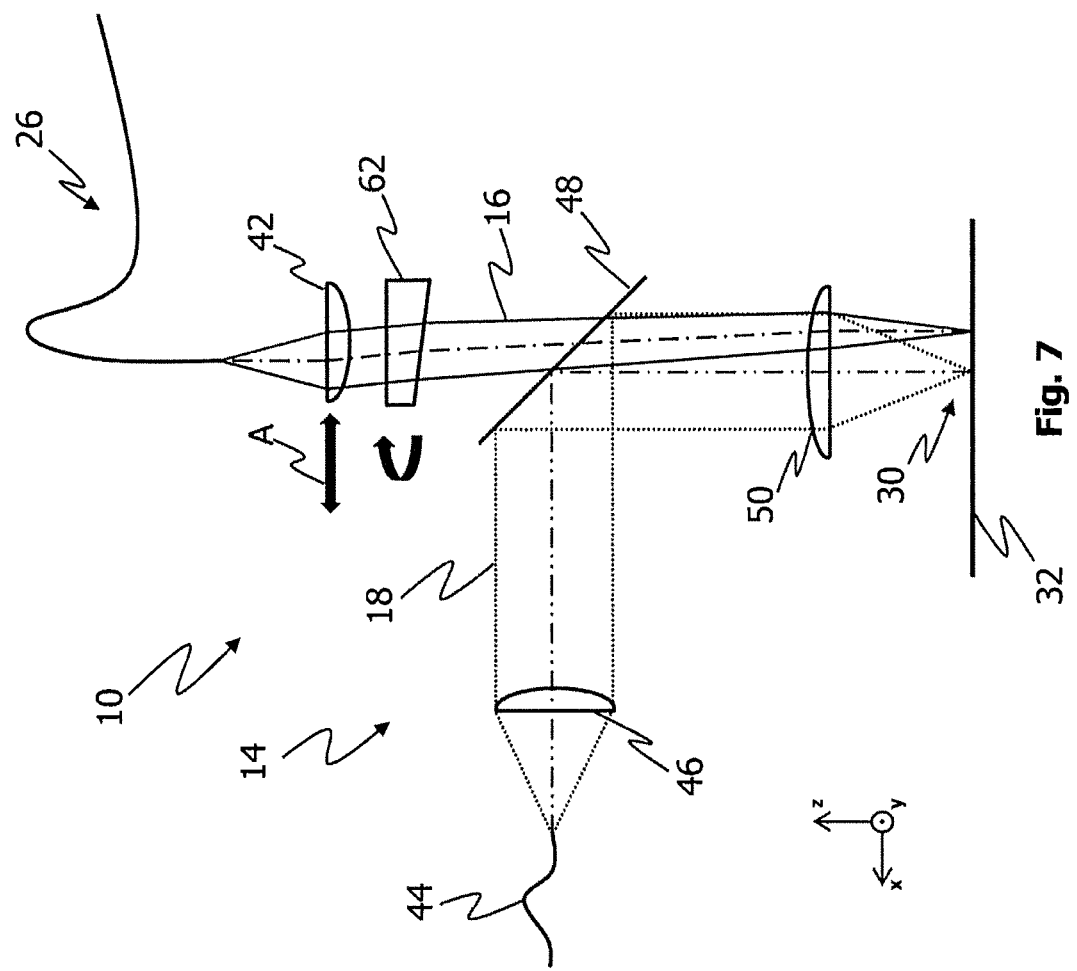
FIG. 7 shows a detail of a device with a measurement device and a processing device according to a fourth embodiment of the invention.

FIG. 7 shows another embodiment of the invention, which differs from the previous embodiment in that, instead of the galvanic mirror, a rotating wedge plate 62 is arranged in the beam path of the measurement beam 16. The rotary wedge plate 62 is arranged in the beam path of the measurement beam 16. The rotary wedge plate 62 is arranged downstream from the collimation lens 42, so that the measurement beam 16 emerging from the transport fiber of the measurement arm 26 passes first through the collimation lens 42 and then through the rotary wedge plate 62. The axis of rotation of the rotary wedge plate 62 is essentially coaxial with the optical axis of the measurement beam 16.

Due to the structural design of the rotary wedge plate 62, the measurement beam 16 is further deflected in addition to the previous deflection by the collimation lens 42. This additional deflection by means of the rotary wedge plate 62 shifts the measurement beam 16 along a circular path on the workpiece surface. This permits circular scanning of the plurality of measurement points in the respective measurement positions predetermined by the collimation lens 42. The angle of the nonplanar surface of the rotary wedge plate 62 in this arrangement determines the radius of the arc of the circle of the measurement beam scanning on the workpiece surface.

Figure 8:
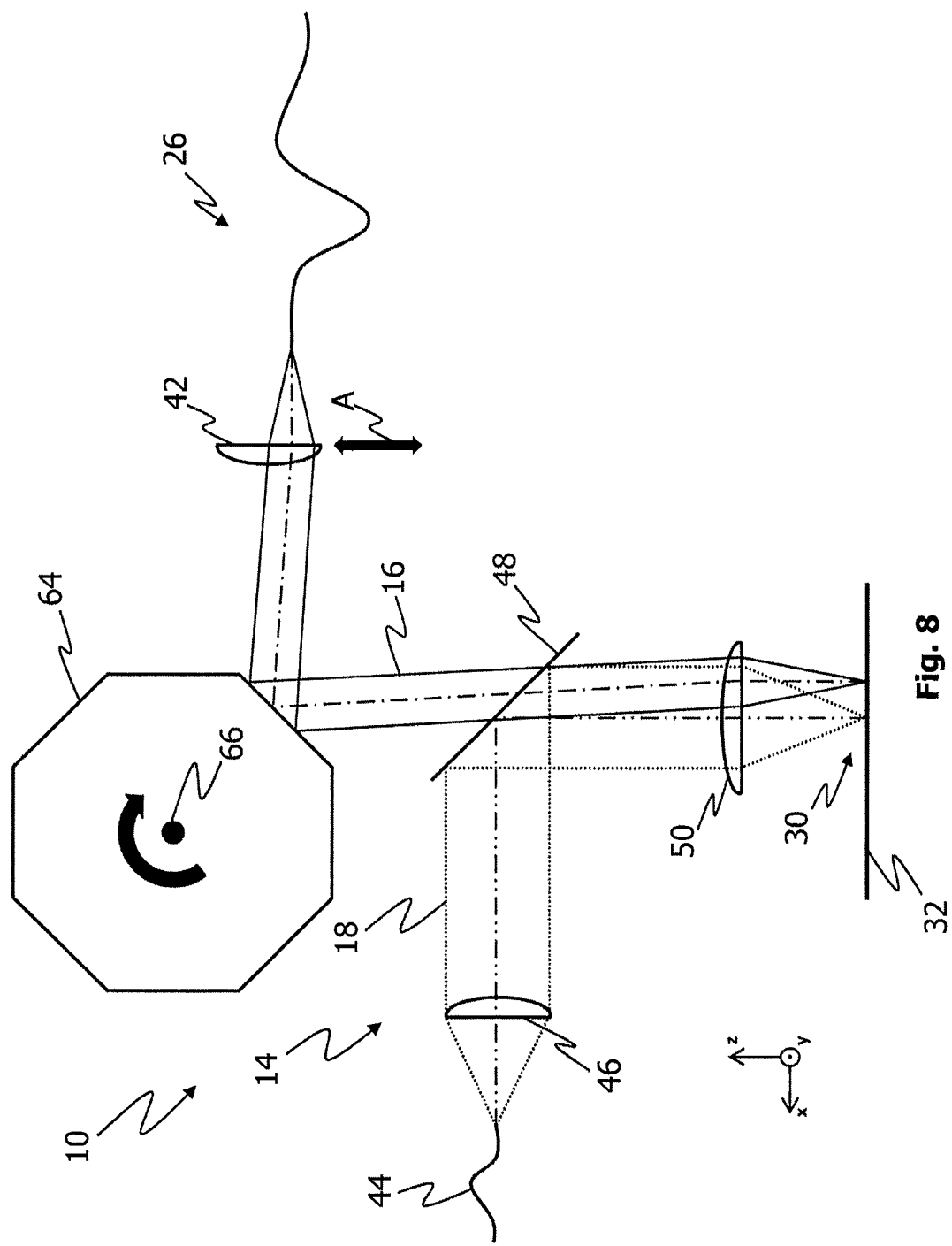
FIG. 8 shows a detail of a device with a measurement device and a processing device according to a fifth embodiment of the invention.

FIG. 8 shows another embodiment of the invention in which a rotary polygonal mirror 64 is provided in the beam path of the measurement beam 16. This polygonal mirror 64 is arranged in such a way that the measurement beam 16 deflected by the first collimation lens 42 strikes a mirror surface of the polygonal mirror 64 and is thereby deflected in the direction of the workpiece 32. By rotating the polygonal mirror 64 about an axis of rotation 66, a different mirror surface of the polygonal mirror 64 can be introduced into the beam path by deflecting the measurement beam 16.

Since the angular position of the respective mirror surface changes continuously with respect to the measurement beam due to the rotation, the measurement beam 16 is additionally moved in the direction of the main processing path (X direction) on the workpiece, but nevertheless the instantaneous measurement position is defined by the displacement position of the first collimation lens 42.

The mirror surfaces of the polygonal mirror 64 also have different angles of inclination with respect to the measurement beam 16, so that this is shifted on the workpiece essentially transversely to the direction of the main processing path. The greater the inclination of the respective mirror surface, the farther is the respective measurement point from the center of the main processing path 30 in the Y direction.

Depending on the number of mirror surfaces of the polygonal mirror 64 and the number of rotations, the number of measurement points to be scanned in the respective measurement positions is determined. The polygonal mirror shown here has a rotational speed of up to 15,000 revolutions per minute so that a much more rapid scanning can be achieved with the polygonal mirror 64 than with a galvanic mirror, for example.

Figure 9:
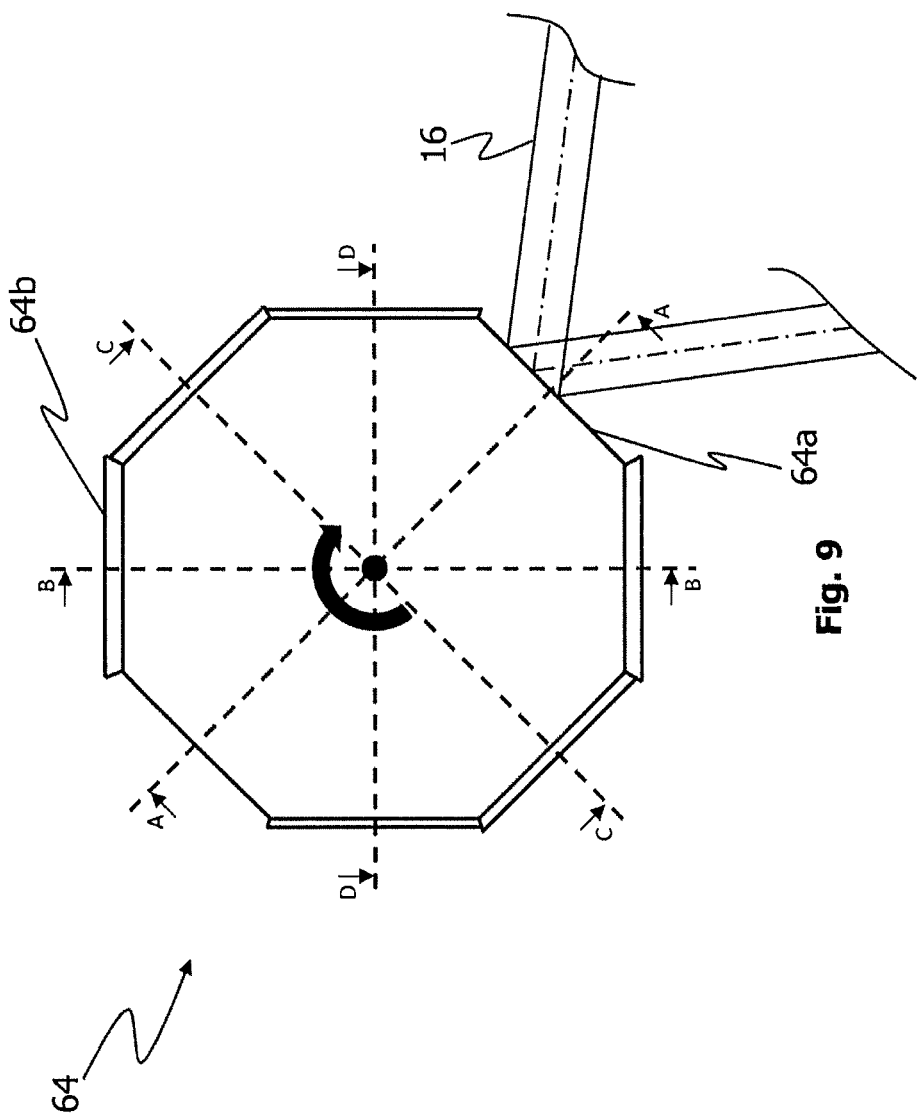
FIG. 9 shows a top view of a polygonal mirror according to the invention.

FIG. 9 shows a detailed top view of the polygonal mirror from FIG. 8. In this detailed top view the different angles of inclination of the individual mirror surfaces of the polygonal mirror 64 can be seen. This also shows that opposing mirror surfaces each have the same angle of inclination, which facilitates the manufacturing of such a polygonal mirror 64.

If, as shown here, the measurement beam 16 strikes the mirror surface 64a which has an angle of inclination of 0°, the measurement beam 16 is not shifted across the direction of the main processing path. However, if the polygonal mirror 64 shown in FIG. 9 is rotated by 135°, the mirror surface 64b enters the beam path of the measurement beam 16 wherein the mirror surface 64b in the embodiment shown here has the largest angle of inclination of the mirror surfaces of the polygonal mirror 64. The measurement beam 16 thus experiences the greatest deflection transversely to the direction of the main processing path on striking the mirror surface 64b.

To perform scanning transversely to the direction of the main processing path on both sides of the main processing path, opposing mirror surfaces of the polygonal mirror 64 may have angle of inclination with switched plus and minus signs. As an alternative, the polygonal mirror may already be inclined with respect to the measurement beam 16, so that the inclined mirror surfaces of the polygonal mirror 64 counteract the inclination of the polygonal mirror 64. In this case the measurement beam 16 may experience the greatest shifting to one side of the main processing path (transversely to the direction of the main processing path) when it strikes the mirror surface 64a without an inclination, while it experiences the greatest deflection to the other side of the main processing path when the beam is deflected by the mirror surface 64b having the greatest inclination.

Figure 10:
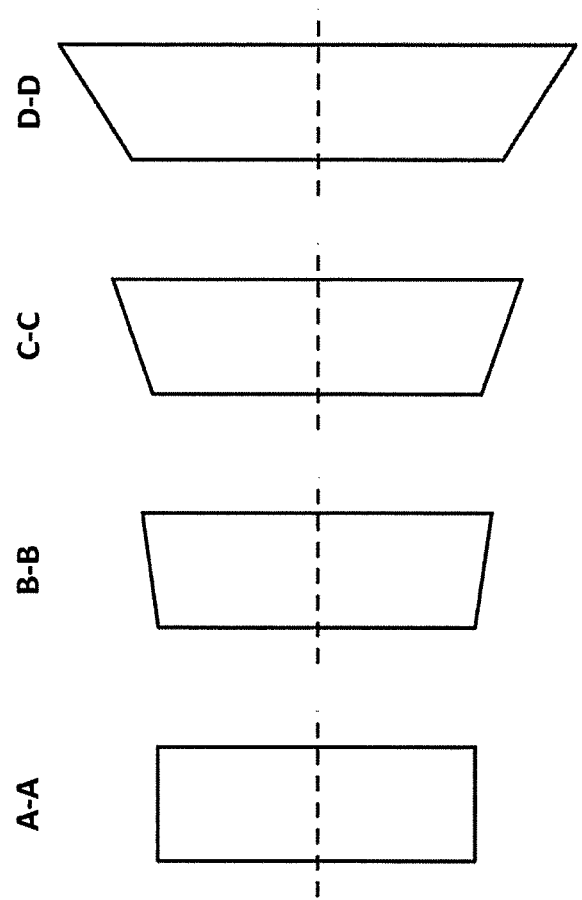
FIG. 10 shows sectional views of the polygonal mirror according to the invention as shown in FIG. 9, FIGS. 11a, 11b and 11c show deflection plots of the measurement beam using a polygonal mirror according to the invention.

FIG. 10 shows different sectional views of the polygonal mirror 64 shown in FIG. 8. It can also be seen here that opposite mirror surfaces of the polygonal mirror 64 have the same angles of inclination for technical reasons involved in the manufacturing.

Figure 11A:
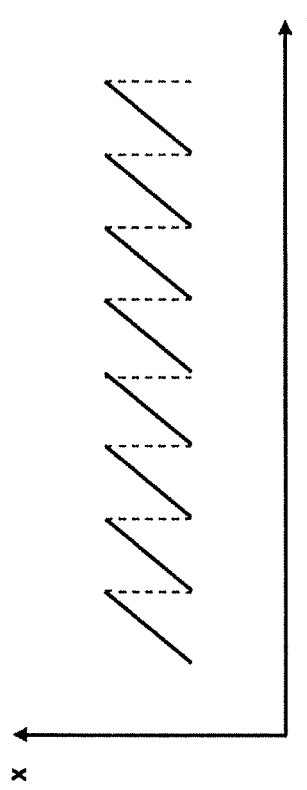
Figure 11B:
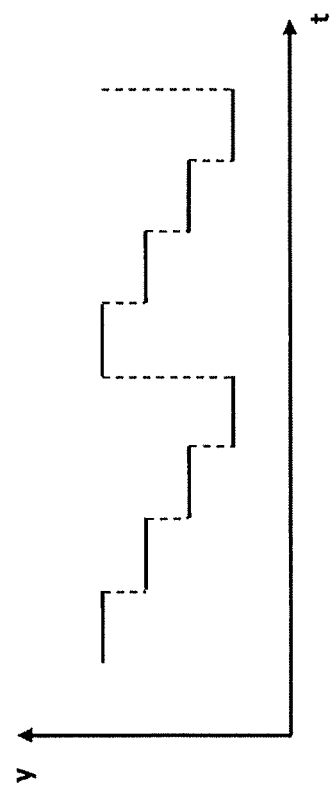
Figure 11C:
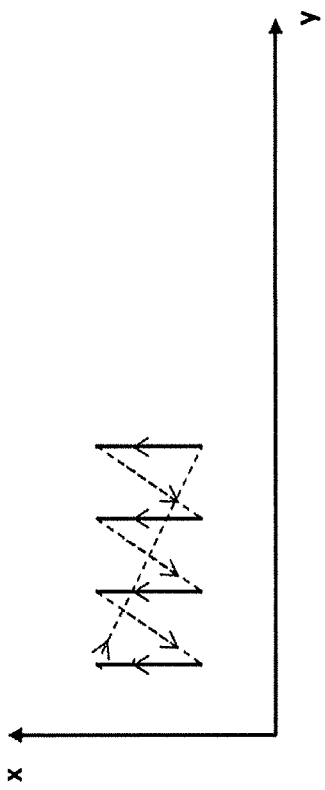

FIGS. 11a to 11c show schematically the course of displacement of the measurement beam by deflection of the measurement beam by means of the polygonal mirror 64 shown in FIG. 8, which has eight mirror surfaces with a total of four different angles of inclination. Only the displacement of the measurement beam by the polygonal mirror 64 but without the additional displacement by the collimation lens 42 is shown in the displacement plot shown here. Accordingly, the displacement plots that are shown represent the respective displacement by means of the polygonal mirror 64 in an instantaneous measurement position, which is predetermined by the collimation lens 42.

FIG. 11a shows the displacement plot in the measurement beam in the X direction over time, i.e., in the direction of the main processing path. Due to the rotation of the polygonal mirror 64, the angular position of the mirror surface lying in the beam path of the measurement beam with respect to the measurement beam 16 changes continuously, so that the measurement beam experiences a continuously increasing displacement in the X direction due to each of the eight mirror surfaces. When a neighboring mirror surface finally enters the beam path of the measurement beam, the measurement beam is shifted back to the starting point in X direction. However, the latter effect is valid only when using an equilateral polygon.

FIG. 11b shows the displacement plot of the measurement beam in the Y direction over time, i.e., transversely to the direction of the main processing path. It can be seen here that the displacement of the measurement beam transversely to the direction of the main processing path remains constant for each mirror surface. This can be attributed to the fact that the angle of inclination of the respective mirror surfaces with respect to the measurement beam is not altered by rotation of the polygonal mirror. Only when a neighboring mirror surface is introduced into the beam path of the measurement beam is the measurement beam shifted to another measurement point transversely to the direction of the main processing path. FIG. 11c shows a displacement plot of the measurement beam in X and Y directions on the workpiece surface such as that executed in the individual measurement positions when using the rotary polygonal mirror 64 shown in FIGS. 8 and 9. The scanning of the measurement beam illustrated in FIG. 11c is run through twice per revolution of the polygonal mirror 64.

It is self-evident that by using an irregular polygonal mirror and/or a polygonal mirror having a different number of mirror surfaces and/or a polygonal mirror having different angles of inclination, the displacement plots described above in both X and Y directions can be varied in almost any desired manner.

It is also possible to use a polygonal mirror which has automatically and/or manually adjustable angles of inclination. This has the advantage that scanning of a measurement range can be performed even during the processing and/or measurement process. In this case it is not necessary to change the polygonal mirror in order to change the scanning.

Figure 12:
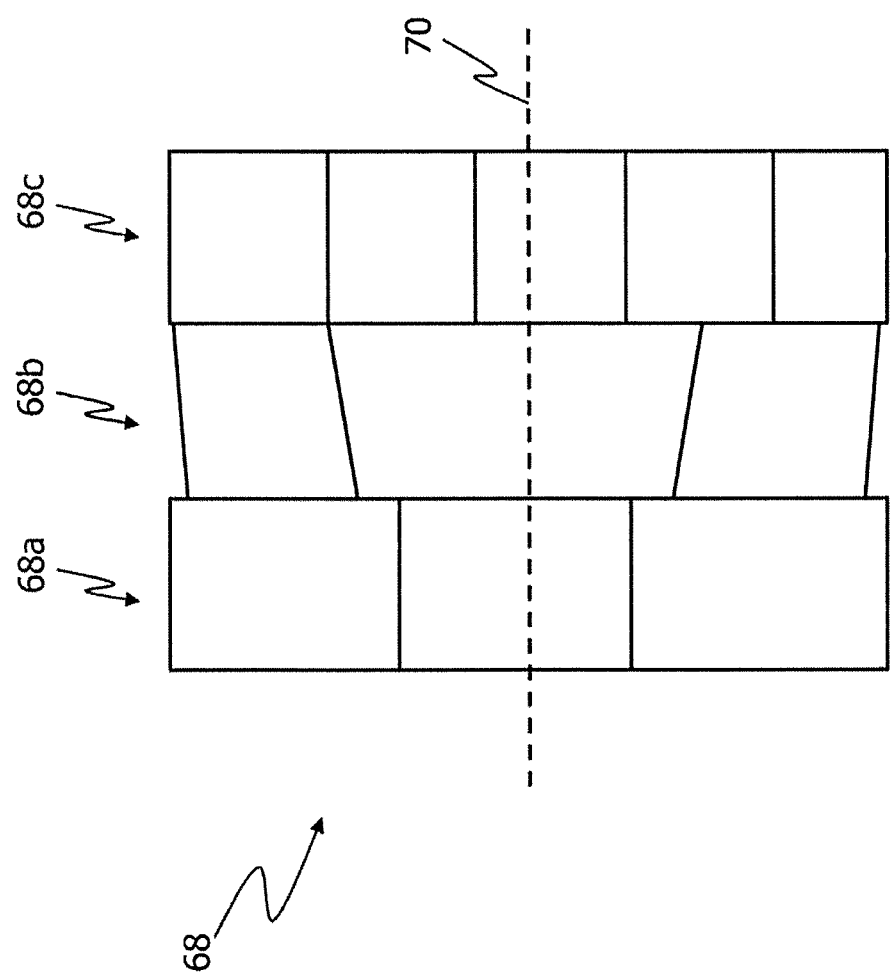
FIG. 12 shows a side view of a polygonal mirror with three mirror planes according to the invention.

FIG. 12 shows an alternative embodiment of a polygonal mirror 68. This polygonal mirror 68 comprises three axially adjacent planes 68a, 68b, 68c. Each of the planes 68a, 68b, 68c may have a different number of mirror surfaces, each with different angular positions and angles of inclination. Such a polygonal mirror 68 can be shifted along its axis of rotation 70 with respect to the measurement beam in order to introduce optionally one of the mirror planes at least partially into the beam path of the measurement beam.

The invention claimed is:

1. A measurement device for a laser processing system for carrying out position measurements by means of a measurement beam on a workpiece, the device comprising:
   an optical coherence tomograph including a measurement beam source for generating the measurement beam configured for carrying out the position measurements on the workpiece,
   wherein the measurement device is coupled to a processing device having a high energy processing beam, which is movable relative to the workpiece in a direction along a predetermined main processing path,
   wherein the measurement device is structured to shift the measurement beam, during processing on the workpiece, within a predetermined measurement range on the workpiece in the direction of the main processing path into at least one of (i) a first measurement position in front of an intended instantaneous processing position as seen in the processing direction, and (ii) a second measurement position behind the intended instantaneous processing position as seen in the processing direction, and
   wherein the measurement device is also structured to shift the measurement beam in at least one of the first and second measurement positions transversely to the direction of the main processing path, so that a plurality of measurement points is scannable by means of the measurement beam transversely to the direction of the main processing path for detecting measured data in the area of at least one of the first and second measurement positions, and
   wherein the measurement device is structured to shift the measurement beam in accordance with instantaneous processing information including information about at least one of the processing direction and a processing rate.

2. The measurement device according to claim 1, wherein the measurement device is structured to shift the measurement beam in the direction of the main processing path into at least one third measurement position which lies in the area of the intended instantaneous processing position.

3. The measurement device according to claim 2, wherein, for detecting a maximum depth of penetration of the processing beam in the third measurement position, the measurement beam is shiftable to at least two other measurement points in the direction of the main processing path.

4. The measurement device according to claim 1, wherein an illumination intensity of the measurement beam source is variable as a function of the measurement points.

5. The measurement device according to claim 1, wherein an illumination intensity of the measurement beam and/or an illumination intensity of the reference measurement beam is variable as a function of the measurement points.

6. The measurement device according to claim 1, wherein the measurement device includes a reception unit which receives the processing information in the form of field bus data or sensor data.

7. The measurement device according to claim 1, wherein the measurement device has a memory unit, wherein the measurement device stores measured data detected by the position measurements in the memory unit and wherein the memory unit stores a plurality of measured data in a data packet.

8. The measurement device according to claim 1, wherein the measurement beam is shiftable to the measurement points at a first rate, which is greater than a second rate, at which the measurement beam is shiftable between the measurement positions in the direction of the main processing path.

9. The measurement device according to claim 1, wherein the measurement device comprises at least one shiftable first collimation lens through which the measurement beam passes, wherein the first collimation lens is shiftable transversely to an optical axis of the measurement beam in order to shift the measurement beam between the measurement positions.

10. The measurement device according to claim 9, wherein the first collimation lens is shiftable in a translatory manner along a first displacement axis to shift the measurement beam into the measurement positions.

11. The measurement device according to claim 9, wherein the first collimation lens is shiftable in a translatory motion along a second displacement axis transversely to the optical axis of the measurement beam in order to shift the measurement beam transversely to the direction of the main processing path.

12. The measurement device according to claim 1, wherein the measurement device further comprises a shiftable additional optical component through which the measurement beam passes or which reflects the measurement beam to shift the measurement beam at least transversely to the direction of the main processing path.

13. An apparatus for processing the workpiece by means of the high energy processing beam which can be moved in the processing direction along the predetermined main processing path relative to the workpiece, where the apparatus comprises:
   the processing device having a processing beam source and a processing beam lens system,
   and a beam splitter for coaxial coupling of the measurement beam with the processing beam, and a measurement device according to claim 1.

14. A method for carrying out position measurements by means of a measurement beam on a workpiece, wherein the workpiece is intended for processing by means of a high energy processing beam, which is moved in a processing direction along a predetermined main processing path relative to the workpiece, wherein the method comprises:

generating a measurement beam by means of a measurement beam source of an optical coherence tomograph; and shifting the measurement beam within a predetermined measurement range on the workpiece, wherein the measurement beam is shifted in the direction of the main processing path during the processing on the workpiece into at least one of a first measurement position and a second measurement position by means of the measurement device, wherein the first measurement position lies in front of an intended instantaneous processing position as seen in the processing direction, and the second measurement position lies behind the intended instantaneous processing position, as seen in the processing direction, wherein the measurement beam is shifted in at least one of the first measurement position and the second measurement position transversely to the direction of the main processing path, so that in the region of the first and second measurement positions a plurality of measurement points is scanned in by means of the measurement beam transversely to the direction of the main processing path for detecting the acquisition of measured data, and wherein the measurement beam is shifted in accordance instantaneous processing information including information about at least one of the processing direction and a processing rate.

* * * * *